United States Patent
Kono et al.

(10) Patent No.: US 11,868,550 B2
(45) Date of Patent: Jan. 9, 2024

(54) INPUT DETECTION SYSTEM

(71) Applicant: Japan Display Inc., Tokyo (JP)

(72) Inventors: Takaaki Kono, Tokyo (JP); Makoto Hayashi, Tokyo (JP); Yuto Kakinoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 133 days.

(21) Appl. No.: 17/505,816

(22) Filed: Oct. 20, 2021

(65) Prior Publication Data

US 2022/0137727 A1 May 5, 2022

(30) Foreign Application Priority Data

Oct. 29, 2020 (JP) ................. 2020-181646

(51) Int. Cl.
*G06F 3/041* (2006.01)
*G06F 3/044* (2006.01)
*G06F 3/0362* (2013.01)

(52) U.S. Cl.
CPC .......... *G06F 3/0362* (2013.01); *G06F 3/0416* (2013.01); *G06F 3/0443* (2019.05); *G06F 3/0448* (2019.05)

(58) Field of Classification Search
CPC .... G06F 3/0362; G06F 3/0416; G06F 3/0443; G06F 3/0448; G06F 3/03548; G06F 3/0395; G06F 3/04166; G06F 3/0412; G06F 3/0418

See application file for complete search history.

(56) References Cited

U.S. PATENT DOCUMENTS

| 9,952,699 | B2* | 4/2018 | Long | G06F 3/0446 |
| 10,599,275 | B2* | 3/2020 | He | G06F 3/04164 |
| 2010/0147600 | A1* | 6/2010 | Orsley | G06F 3/03547 |
| | | | | 178/18.03 |
| 2011/0248954 | A1* | 10/2011 | Hamada | G06F 3/0448 |
| | | | | 345/174 |
| 2012/0154312 | A1* | 6/2012 | Huang | G06F 3/0443 |
| | | | | 345/173 |
| 2013/0342331 | A1* | 12/2013 | Fukushima | G06F 3/045 |
| | | | | 340/407.2 |
| 2017/0212618 | A1* | 7/2017 | Teranishi | G06F 3/0445 |
| 2017/0212634 | A1* | 7/2017 | Huang | G06F 3/0445 |
| 2017/0316901 | A1* | 11/2017 | Sawada | H01H 19/02 |

(Continued)

FOREIGN PATENT DOCUMENTS

| JP | 6342105 | B1 | 6/2018 |
| JP | 6532631 | B1 | 6/2019 |
| JP | 2020154671 | A * | 9/2020 |

*Primary Examiner* — Amy Onyekaba
(74) *Attorney, Agent, or Firm* — K&L Gates LLP

(57) ABSTRACT

An input detection system includes a detection device including a plurality of detection electrodes arrayed in a detection region, and an input support device including a first electrode, a second electrode provided so as to be movable on a concentric circle about a rotating axis overlapping with the first electrode, and a coupling portion that electrically couples the first electrode and the second electrode. A position of the rotating axis of the input support device is fixed to the detection region of the detection device, and a reference potential is supplied to the detection electrode corresponding to the first electrode and a drive signal is supplied to the detection electrode corresponding to the second electrode.

10 Claims, 22 Drawing Sheets

(56) References Cited

U.S. PATENT DOCUMENTS

| | | | | |
|---|---|---|---|---|
| 2019/0064967 A1* | 2/2019 | He | ............ | G06F 3/04164 |
| 2019/0080864 A1* | 3/2019 | Sawada | ............ | H01H 15/06 |
| 2020/0081404 A1* | 3/2020 | Maeda | ............ | H02P 29/40 |
| 2020/0174585 A1* | 6/2020 | Ju | ............ | G06F 3/04845 |
| 2020/0301547 A1* | 9/2020 | Mori | ............ | G06F 3/0488 |
| 2020/0348795 A1* | 11/2020 | Bechstein | ............ | G06F 3/0445 |
| 2021/0232269 A1* | 7/2021 | Sasaki | ............ | G06F 3/0446 |
| 2022/0004303 A1* | 1/2022 | Kakinoki | ............ | G06F 3/0446 |
| 2022/0043522 A1* | 2/2022 | Shepelev | ............ | G06F 3/0362 |
| 2022/0244033 A1* | 8/2022 | Araki | ............ | G06F 3/0362 |
| 2022/0317783 A1* | 10/2022 | Jeon | ............ | H03K 17/975 |

* cited by examiner

INPUT DETECTION SYSTEM

CROSS-REFERENCE TO RELATED APPLICATION

This application claims the benefit of priority from Japanese Patent Application No. 2020-181646 filed on Oct. 29, 2020, the entire contents of which are incorporated herein by reference.

BACKGROUND

1. Technical Field

The present disclosure relates to an input detection system.

2. Description of the Related Art

Japanese Patent Nos. 6342105 and 6532631 describe an input support device that is placed on a touch panel configured to detect change in electrostatic capacitance or change in a contact region and supports input operations through the touch panel.

The same drive signal is supplied to a plurality of detection electrodes in a self-electrostatic capacitance-type touch panel. When the input support device is arranged above the self-electrostatic capacitance-type touch panel, potentials of a plurality of electrodes provided in the input support device therefore vary with the same potential in accordance with the drive signal that is supplied to the detection electrodes. It can therefore be difficult to detect the input support device.

An object of the present disclosure is to provide an input detection system capable of preferably detecting an input support device.

SUMMARY

An input detection system according an embodiment of the present disclosure includes a detection device including a plurality of detection electrodes arrayed in a detection region, and an input support device including a first electrode, a second electrode provided so as to be movable on a concentric circle about a rotating axis overlapping with the first electrode, and a coupling portion that electrically couples the first electrode and the second electrode. A position of the rotating axis of the input support device is fixed to the detection region of the detection device, and a reference potential is supplied to the detection electrode corresponding to the first electrode and a drive signal is supplied to the detection electrode corresponding to the second electrode.

DETAILED DESCRIPTION

Figure 1:
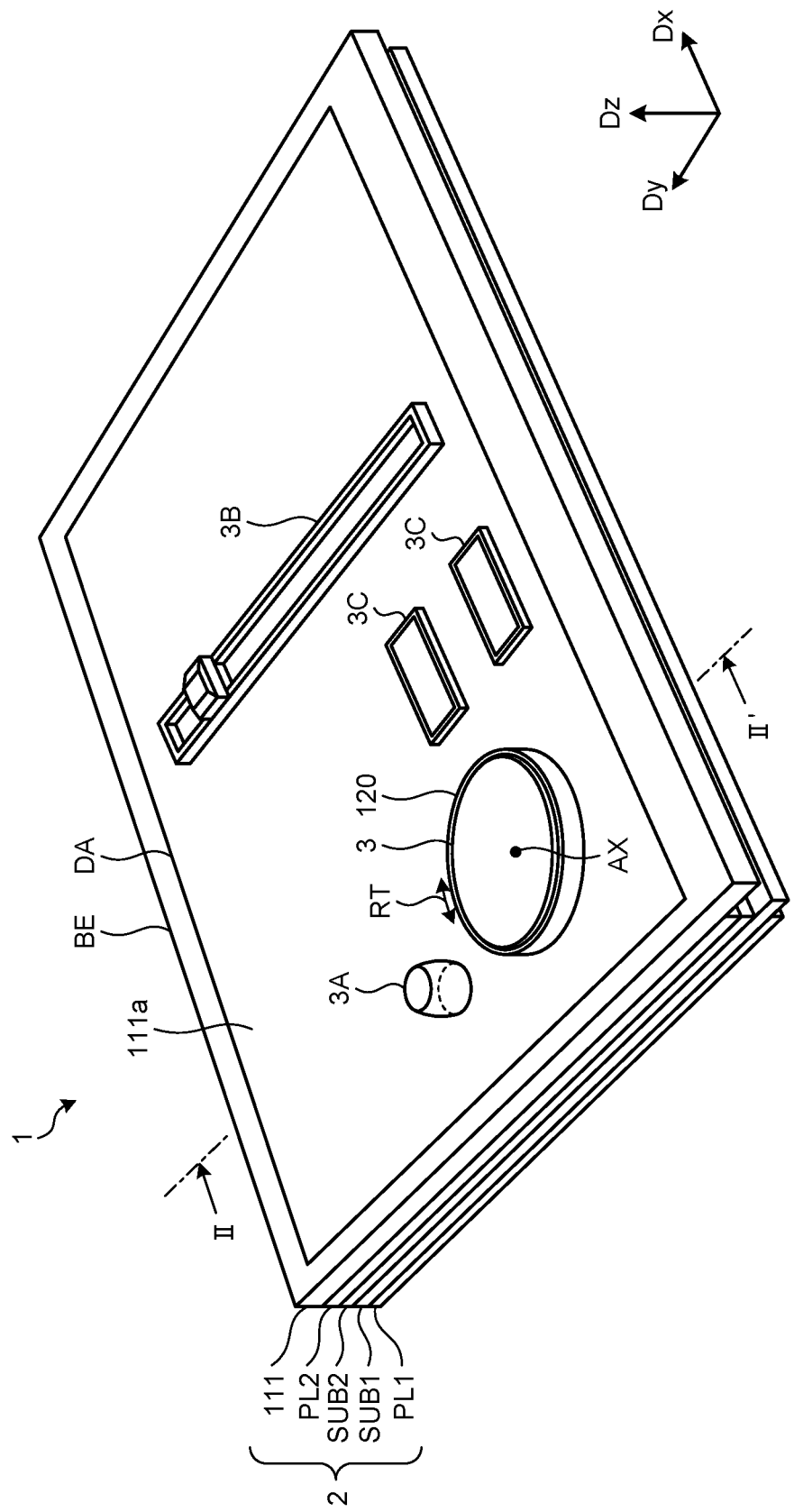
FIG. 1 is a perspective view schematically illustrating an input detection system according to a first embodiment.

Modes for carrying out the present disclosure (embodiments) will be described in detail with reference to the drawings. Contents described in the following embodiment do not limit the present disclosure. Components described below include those that can be easily assumed by those skilled in the art and substantially the same components. Furthermore, the components described below can be appropriately combined. What is disclosed herein is merely an example, and it is needless to say that appropriate modifications within the gist of the present disclosure at which those skilled in the art can easily arrive are encompassed in the scope of the present disclosure. In the drawings, widths, thicknesses, shapes, and the like of the components can be schematically illustrated in comparison with actual modes for clearer explanation. They are, however, merely examples and do not limit interpretation of the present disclosure. In the present disclosure and the drawings, the same reference numerals denote components similar to those described before with reference to the drawing that has been already referred, and detail explanation thereof can be appropriately omitted.

In the present specification and the scope of the claims, when a mode in which a second structure is arranged above a first structure is represented, simple expression "above" includes both the case in which the second structure is arranged immediately above the first structure in a manner contacting the first structure, and the case in which the second structure is arranged above the first structure with a third structure interposed therebetween, unless otherwise specified.

First Embodiment

Figure 2:
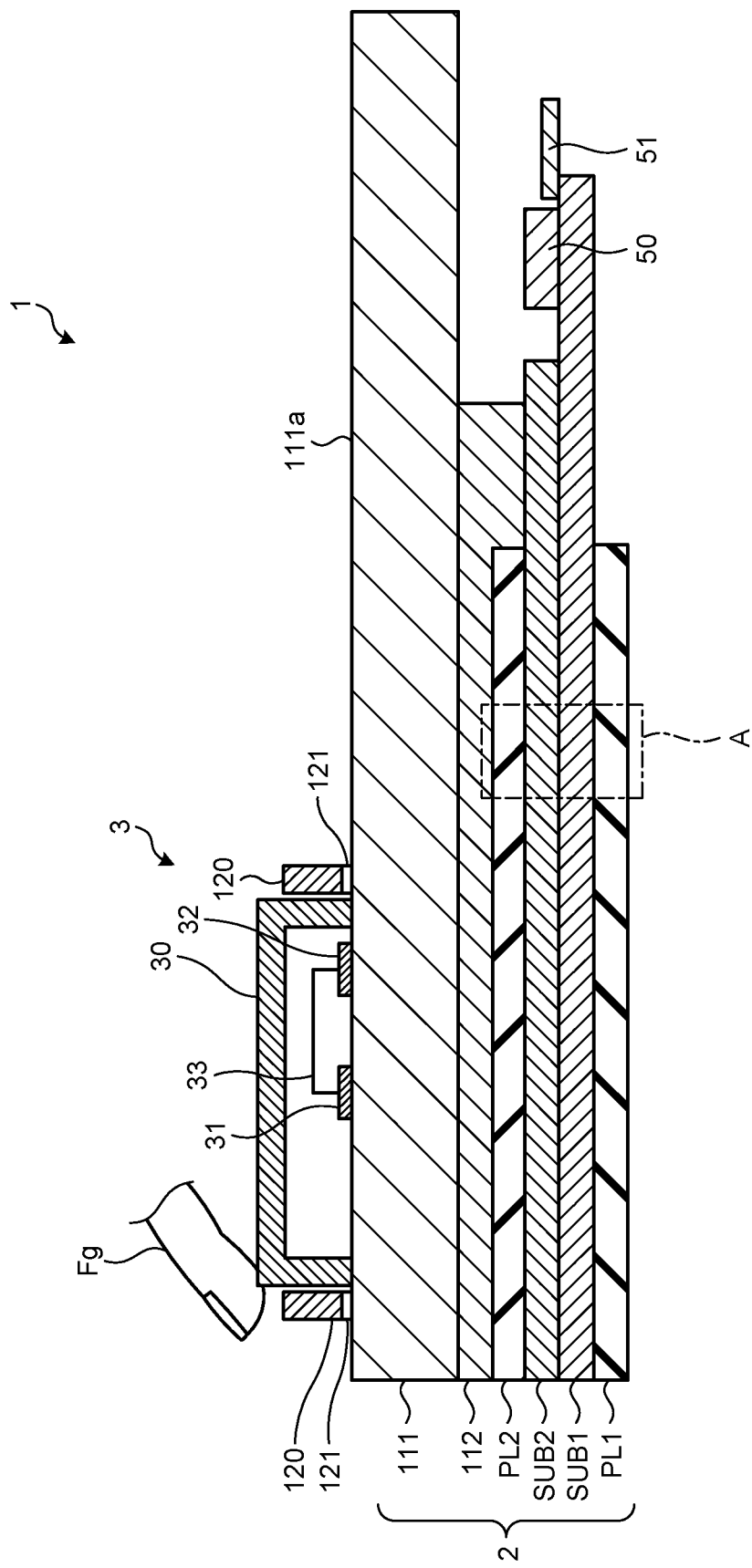
FIG. 2 is a cross-sectional view cut along line II-II' in FIG. 1.

FIG. 1 is a perspective view schematically illustrating an input detection system according to a first embodiment. FIG. 2 is a cross-sectional view cut along line II-II' in FIG. 1. As illustrated in FIG. 1 and FIG. 2, an input detection system 1 includes a display device 2 and an input support device 3.

One direction of a plane (upper surface 111a) of the display device 2 is a first direction Dx, and a direction orthogonal to the first direction Dx is a second direction Dy. The second direction Dy is not limited thereto and may intersect with the first direction Dx at an angle other than 90°. A third direction Dz orthogonal to the first direction Dx and the second direction Dy corresponds to the thickness direction of an array substrate SUB1.

As illustrated in FIG. 1, the display device 2 includes the array substrate SUB1, a counter substrate SUB2, a first polarizing plate PL1, a second polarizing plate PL2, a cover member 111, and an adhesive layer 112 (see FIG. 2). The first polarizing plate PL1, the array substrate SUB1, the counter substrate SUB2, the second polarizing plate PL2, the adhesive layer 112, and the cover member 111 are stacked in this order in the third direction Dz.

The array substrate SUB1 is a drive circuit substrate for driving a plurality of pixels PX. The array substrate SUB1 includes a first substrate 10 as a base body. The array substrate SUB1 includes switching elements Tr provided on the first substrate 10 and various wiring lines such as scan lines GL and pixel signal lines SL (see FIG. 4). The counter substrate SUB2 is provided so as to face the array substrate SUB1 and includes a second substrate 20 as a base body. The counter substrate SUB2 includes color filters CF and a light shielding layer BM (see FIG. 3) provided on the second substrate 20. The first substrate 10 and the second substrate 20 are made of a material having a light transmitting property, such as a glass substrate and a resin substrate.

The length of the array substrate SUB1 in the second direction Dy is larger than the length of the counter substrate SUB2 in the second direction Dy. As illustrated in FIG. 1, the array substrate SUB1 (first substrate 10) has a portion (protruding portion) projecting to the outer side of the counter substrate SUB2 (second substrate 20). The lengths of the array substrate SUB1 and the counter substrate SUB2 in the second direction Dy are smaller than the lengths thereof in the first direction Dx. The lengths are not limited to being set in this manner, and the lengths of the array substrate SUB1 and the counter substrate SUB2 in the second direction Dy may be larger than the lengths thereof in the first direction Dx.

As illustrated in FIG. 1, a peripheral region BE is provided on the outer side of a display region DA in the display device 2. The display region DA is formed to have a square shape but the outer shape of the display region DA is not limited thereto. For example, the display region DA may have a substantially square shape with curved corners or may have a cutout. Alternatively, the display region DA may have another polygonal shape or another shape such as a circular shape and an elliptic shape.

The display region DA is a region for displaying an image and is a region in which the pixels PX are provided. The peripheral region BE indicates a region on the inner side of the outer circumference of the array substrate SUB1 and on the outer side of the display region DA. The peripheral region BE may have a frame shape surrounding the display region DA, and in this case, the peripheral region BE can also be referred to as a frame region.

As illustrated in FIG. 2, a display integrated circuit (IC) 50 and a wiring substrate 51 are coupled to the protruding portion of the array substrate SUB1. The display IC 50 includes a control circuit that controls display and touch detection of the display device 2. The display IC 50 is not limited to this example and may be mounted on the wiring substrate 51. Arrangement of the display IC 50 is not limited thereto, and the display IC 50 may be provided above a control substrate or a flexible substrate outside the module, for example.

The wiring substrate 51 is configured by a flexible printed circuits (FPC), for example. The wiring substrate 51 is coupled to a plurality of terminals of the first substrate 10.

As illustrated in FIG. 1 and FIG. 2, the input support device 3 is arranged (mounted) on the upper surface 111a of the cover member 111 for use. A user operates the input support device 3 arranged above the display device 2 to perform an input operation on the display device 2. The input support device 3 is, for example, a rotary knob and has a circular shape in a plan view when seen from the upper surface 111a of the display device 2. A fixing portion 120 surrounding the input support device 3 is provided on the upper surface 111a of the cover member 111. The fixing portion 120 adheres to the upper surface 111a with an adhesive layer 121. The input support device 3 is arranged in such a manner that a position of a rotating axis AX in a plane is fixed with the fixing portion 120 and a rotation operation RT can be made about the rotating axis AX.

The display device 2 can detect the rotation operation RT of the input support device 3. That is to say, in the embodiment, the display region DA is a region in which a plurality of detection electrodes DE (see FIG. 5) are provided and serves also as a detection region.

As illustrated in FIG. 2, the input support device 3 includes a housing 30, a first electrode 31, a second electrode 32, and a coupling portion 33. The housing 30 is a hollow member in which a space is provided. The housing 30 can formed by an insulator made of a resin material or the like or a conductor made of a metal material or the like, and the insulator is more preferable. The first electrode 31, the second electrode 32, and the coupling portion 33 are provided in the housing 30. The first electrode 31 and the second electrode 32 are arranged so as to face the detection electrodes DE in the display region DA. The first electrode 31 and the second electrode 32 are provided so as to be electrically coupled by the coupling portion 33 and not to be coupled to the housing 30. Any configuration of the coupling portion 33 may be employed as long as it can electrically couple the first electrode 31 and the second electrode 32, and the coupling portion 33 is, for example, coupling wiring formed by a conductor.

FIG. 1 illustrates a plurality of input support devices 3A, 3B, and 3C as other examples of the input support device 3. The input support device 3A is a rotary knob and is formed into a tab shape having a smaller plane than that of the input support device 3. The input support device 3B is a slider, and an input operation can be performed by displacement of a tab thereof in a plane. The input support device 3B has a bar-like shape in a plan view. The input support device 3C is a button or an input key, and an input operation can be performed by touching the input support device 3C or performing a press-in operation thereon. The input detection system 1 is not limited to the configuration in which all of the input support devices 3, 3A, 3B, and 3C are mounted, and it is sufficient that at least equal to or more than one of the input support devices 3, 3A, 3B, and 3C is provided. Hereinafter, the input support device 3 is described. Explanation of the input support device 3 can be applied also to the other input support devices 3A, 3B, and 3C.

Figure 3:
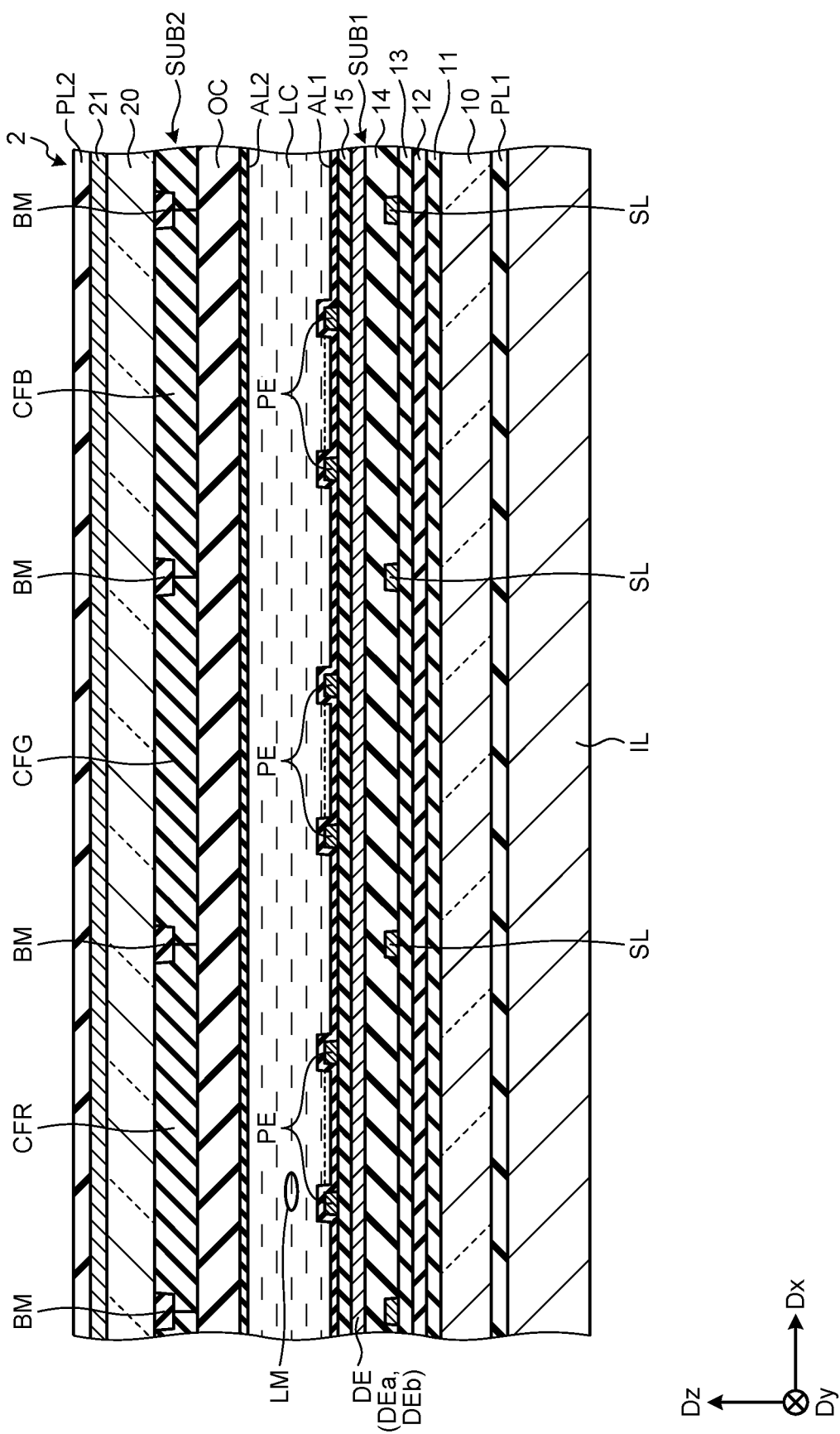
FIG. 3 is a cross-sectional view illustrating the schematic cross-sectional configuration of a display device.

FIG. 3 is a cross-sectional view illustrating the schematic cross-sectional configuration of the display device. FIG. 3 is a cross-sectional view of a part surrounded by a region A in FIG. 2, for example. As illustrated in FIG. 3, the display device 2 further includes an illumination device IL. The counter substrate SUB2 is arranged so as to face the surface of the array substrate SUB1 in the vertical direction. A liquid crystal layer LC is provided between the array substrate SUB1 and the counter substrate SUB2. The liquid crystal layer LC as a display function layer is arranged between the first substrate 10 and the second substrate 20. The illumination device IL, the first polarizing plate PL1, the array substrate SUB1, the counter substrate SUB2, and the second polarizing plate PL2 are stacked in this order in the third direction Dz.

The array substrate SUB1 faces the illumination device IL, and the counter substrate SUB2 is located on the display surface side. The illumination device IL emits light toward the array substrate SUB1. For example, a side light-type backlight or a direct-type backlight can be applied as the illumination device IL. Although various types of the illumination device IL can be applied, explanation of the detail configurations thereof is omitted.

An optical element including the first polarizing plate PL1 faces the first substrate 10. To be more specific, the first polarizing plate PL1 is arranged on the outer surface of the first substrate 10 or on the surface thereof facing the illumination device IL. An optical element including the second polarizing plate PL2 faces the second substrate 20. To be more specific, the second polarizing plate PL2 is arranged on the outer surface of the second substrate 20 or on the surface thereof on the observation position side. A first polarization axis of the first polarizing plate PL1 and a second polarization axis of the second polarizing plate PL2 have a crossed nicol positional relation in an X-Y plane, for example. The optical elements including the first polarizing plate PL1 and the second polarizing plate PL2 may include another optical function element such as a phase difference plate.

The array substrate SUB1 includes insulating films 11, 12, 13, 14, and 15, the pixel signal lines SL, pixel electrodes PE, the detection electrodes DE (common electrodes CE), and a first orientation film AL1 on the side of the first substrate 10 that faces the counter substrate SUB2.

In the present specification, the direction toward the second substrate 20 from the first substrate 10 in the direction perpendicular to the first substrate 10 is an "upper-side direction" or simply an "upward direction". The direction toward the first substrate 10 from the second substrate 20 is a "lower-side direction" or simply a "downward direction". The expression "plan view" indicates a positional relation when seen from the direction perpendicular to the first substrate 10.

The insulating film 11 is provided above the first substrate 10. The insulating films 11, 12, and 13, and the insulating film 15 are inorganic insulating films made of, for example, an inorganic material having a light transmitting property, such as silicon oxide and silicon nitride.

The insulating film 12 is provided above the insulating film 11. The insulating film 13 is provided above the insulating film 12. The pixel signal lines SL are provided above the insulating film 13. The insulating film 14 is provided above the insulating film 13 and covers the pixel signal lines SL. The insulating film 14 is made of a resin material having a light transmitting property and have a film thickness that is thicker than those of the other insulating films made of the inorganic material. Although not illustrated in FIG. 3, the scan lines GL are provided above the insulating film 12, for example.

The detection electrodes DE are provided above the insulating film 14. The detection electrodes DE are provided in the display region DA and are divided into a plurality of parts by slits. The detection electrodes DE are covered by the insulating film 15. The detection electrodes DE serve as the detection electrodes DE for touch detection and the common electrodes CE in display. Although the display device 2 at a position that does not overlap with the input support device 3 is illustrated in FIG. 3, the detection electrodes DE (a first detection electrode DEa and second detection electrodes DEb (see FIG. 6)) overlapping with the input support device 3 are provided in the same layer as a layer of detection electrodes DE (third detection electrodes) not overlapping with the input support device 3, and are made of the same material.

The pixel electrodes PE are provided above the insulating film 15 and face the detection electrodes DE with the insulating film 15 interposed therebetween. The pixel electrodes PE and the detection electrodes DE are made of, for example, a conductive material having a light transmitting property, such as indium tin oxide (ITO) and indium zinc oxide (IZO). The first orientation film AL1 covers the pixel electrodes PE and the insulating film 15.

The counter substrate SUB2 includes the light shielding layer BM, color filters CFR, CFG, and CFB, an overcoat layer OC, and a second orientation film AL2 on the side of the second substrate 20 that faces the array substrate SUB1. The counter substrate SUB2 includes a conductive layer 21 and the second polarizing plate PL2 on the side of the second substrate 20 that is opposite to the array substrate SUB1.

The light shielding layer BM is located on the second substrate 20 on the side facing the array substrate SUB1 in the display region DA. The light shielding layer BM defines openings that respectively face the pixel electrodes PE. The pixel electrodes PE are partitioned for the respective openings of the pixels PX. The light shielding layer BM is made of a resin material in black color or a metal material having a light shielding property.

The color filters CFR, CFG, and CFB are located on the second substrate 20 on the side facing the array substrate SUB1, and end portions thereof overlap with the light shielding layer BM. As an example, the color filters CFR, CFG, and CFB are made of a resin material colored in red, green, and blue, respectively.

The overcoat layer OC covers the color filters CFR, CFG, and CFB. The overcoat layer OC is made of a resin material having a light transmitting property. The second orientation film AL2 covers the overcoat layer OC. The first orientation film AL1 and the second orientation film AL2 are made of, for example, a material exhibiting horizontal orientation performance.

The conductive layer 21 is provided above the second substrate 20. The conductive layer 21 is made of a conductive material having a light transmitting property, such as ITO. Static electricity applied from the outside and static electricity charged to the second polarizing plate PL2 flow through the conductive layer 21. The display device 2 can remove static electricity in a short period of time and can reduce static electricity that is applied to the liquid crystal layer LC as a display layer. The conductive layer 21 may not be provided.

The array substrate SUB1 and the counter substrate SUB2 are arranged such that the first orientation film AL1 and the second orientation film AL2 face each other. The liquid crystal layer LC is enclosed into between the first orientation film AL1 and the second orientation film AL2. The liquid crystal layer LC is made of a negative liquid crystal material having a negative dielectric anisotropy or a positive liquid crystal material having a positive dielectric anisotropy.

For example, when the liquid crystal layer LC is made of the negative liquid crystal material and a state in which no voltage is applied to the liquid crystal layer LC is established, liquid crystal molecules LM are initially oriented in such a direction that long axes thereof are along the first direction Dx in the X-Y plane. On the other hand, in a state in which the voltage is applied to the liquid crystal layer LC, that is, in an ON state in which an electric field is formed between the pixel electrodes PE and the detection electrodes DE, the liquid crystal molecules LM receive influences of the electric field and orientation states thereof are changed. In the ON state, a polarization state of incident linearly polarized light is changed in accordance with the orientation states of the liquid crystal molecules LM when the light passes through the liquid crystal layer LC.

Figure 4:
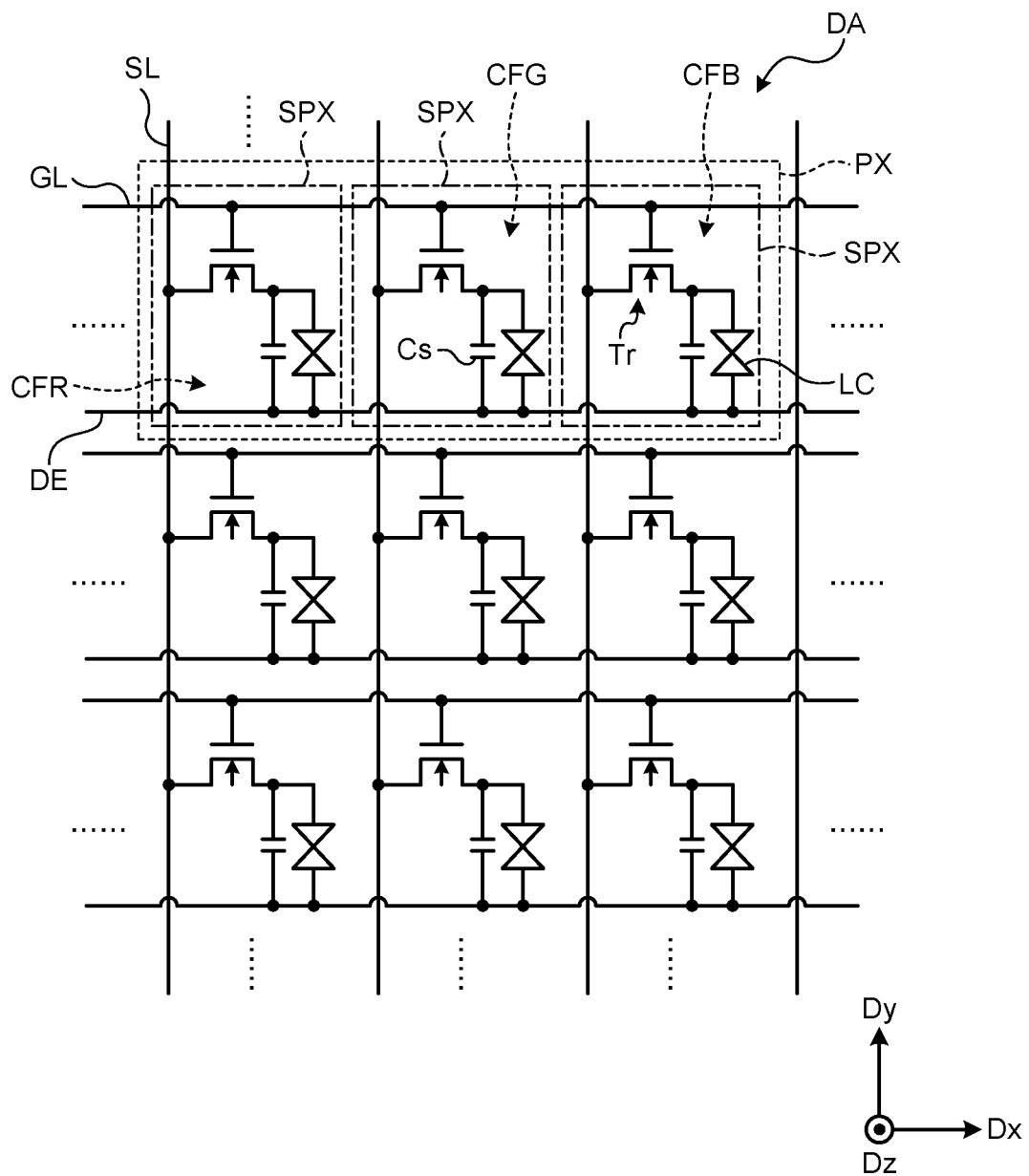
FIG. 4 is a circuit diagram illustrating pixel array of a display region.

FIG. 4 is a circuit diagram illustrating pixel array of the display region. The switching elements Tr of respective sub pixels SPX, the pixel signal lines SL, and the scan lines GL illustrated in FIG. 4, and the like are formed on the array substrate SUB1. The pixel signal lines SL extend in the second direction Dy. The pixel signal lines SL are wiring lines for supplying pixel signals to the pixel electrodes PE (see FIG. 3). The scan lines GL extend in the first direction Dx. The scan lines GL are wiring lines for supplying drive signals (scan signals) for driving the switching elements Tr.

Each pixel PX includes the sub pixels SPX. Each sub pixel SPX includes the switching element Tr and capacitance of the liquid crystal layer LC. The switching element Tr is formed by a thin film transistor and, in this example, is formed by an n-channel metal oxide semiconductor (MOS) TFT. The insulating film 15 is provided between the pixel electrodes PE and the detection electrodes DE illustrated in FIG. 3, and they form holding capacitance Cs illustrated in FIG. 4.

Color regions colored in three colors of red (R), green (G), and blue (B), for example, are periodically arrayed as the color filters CFR, CFG, and CFB. The color regions of the three colors of R, G, and B as one set are made to respectively correspond to the sub pixels SPX. A set of sub pixels SPX corresponding to the color regions of the three colors configures a pixel PX. The color filters may include color regions of equal to or more than four colors. In this case, the pixel PX may include equal to or more than four sub pixels SPX.

Figure 5:
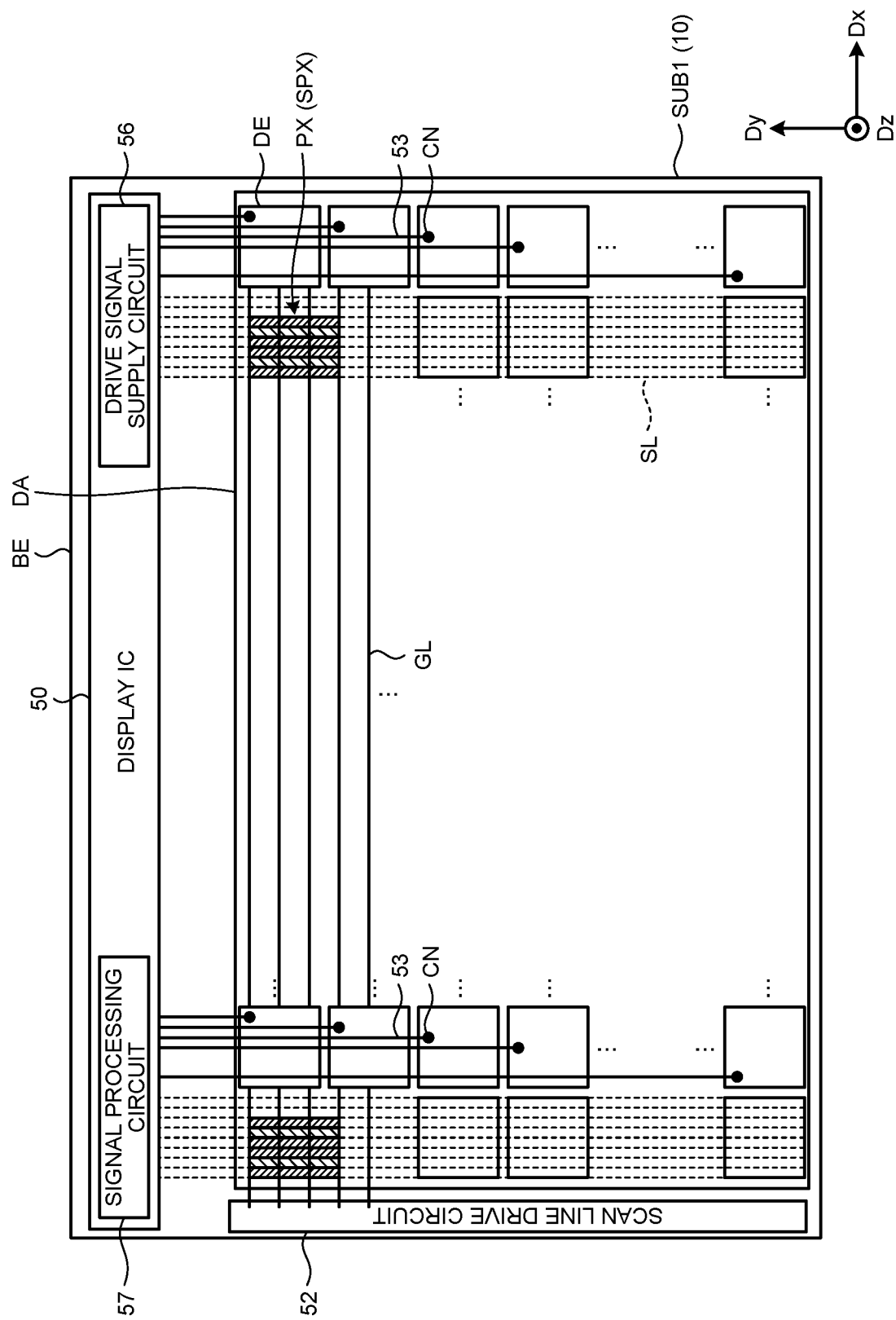
FIG. 5 is a plan view schematically illustrating an array substrate included in the display device.

FIG. 5 is a plan view schematically illustrating the array substrate included in the display device. As illustrated in FIG. 5, the pixels PX (sub pixels SPX) are arrayed in a matrix with a row-column configuration in the display region DA. The detection electrodes DE have square shapes and are arrayed in a matrix with a row-column configuration in the display region DA, but the shape of the detection electrodes DE is not limited to square.

The pixel signal lines SL and the scan lines GL are provided correspondingly to the pixel electrodes PE and the switching elements Tr that the sub pixels SPX have. The pixel signal lines SL are coupled to the control circuit such as the display IC 50 provided in the peripheral region BE. A scan line drive circuit 52 is provided in a region extending along the second direction Dy in the peripheral region BE. The scan lines GL are coupled to the scan line drive circuit 52. The scan line drive circuit 52 supplies the scan signal for driving the switching elements Tr of the pixels PX (sub pixels SPX) to the scan lines GL.

Wiring lines 53 are provided so as to correspond to the respective detection electrodes DE and are coupled to the detection electrodes DE through contact holes CN. The wiring lines 53 extend along the second direction Dy and are aligned in the first direction Dx. The wiring lines 53 and the pixel signal lines SL are coupled to the display IC 50 provided in the peripheral region BE.

Although FIG. 5 illustrates only some detection electrodes DE and some pixels PX (sub pixels SPX) in order to make the drawing easy to view, the detection electrodes DE and the pixels PX are arranged on the entire display region DA. That is to say, the pixels PX (sub pixels SPX) and the detection electrodes DE are provided in an overlapping manner. The pixels PX are arranged so as to overlap with one detection electrode DE. One detection electrode DE is arranged so as to overlap with the pixel signal lines SL.

The detection electrodes DE serve as common electrodes CE in display and the detection electrodes DE for detecting an object to be detected such as a finger Fg and the input support device 3. To be specific, the display IC 50 supplies a display drive signal VCOM to the detection electrodes DE in display. The display IC 50 includes at least a drive signal supply circuit 56. The drive signal supply circuit 56 supplies the display drive signal VCOM or a detection drive signal VD to the detection electrodes DE simultaneously. The display IC 50 includes a detection circuit 55 (see FIG. 7) and a signal processing circuit 57 configured to perform signal processing on detection signals Vdet output from the detection signals DE.

To be specific, in touch detection of detecting the position of the finger Fg, the display IC 50 (drive signal supply circuit 56) supplies the detection drive signal VD to the detection electrodes DE, and the detection signals Vdet based on change in self-electrostatic capacitance are output to the display IC 50. The display IC 50 thereby detects contact or proximity of the finger Fg.

In input support device detection of detecting the input support device 3, the display IC 50 (drive signal supply circuit 56) supplies a reference potential GND and the detection drive signal VD to the detection electrodes DE, and the detection signals Vdet based on change in the self-electrostatic capacitance of the detection electrodes DE are output to the display IC 50.

Next, a method for detecting the input support device 3 will be described with reference to FIG. 6 and FIG. 7. FIG.

6 is a plan view schematically illustrating the input support device and the detection electrodes. The input support device 3 has a circular shape in a plan view as illustrated in FIG. 6. The first electrode 31 is provided at a position overlapping with the rotating axis AX of the input support device 3 in a plan view. The second electrode 32 is provided so as to be movable on a concentric circle about the rotating axis AX. That is to say, when an operator makes his(her) finger Fg or the like contact with the housing 30 to perform the rotation operation RT of the input support device 3, the position of the first electrode 31 in a plane is fixed and the second electrode 32 moves around the first electrode 31. The first electrode 31 and the second electrode 32 have circular shapes in a plan view. The shapes thereof are, however, not limited thereto, and the first electrode 31 and the second electrode 32 may each have another shape such as a square shape or a polygonal shape.

As described above, the position of the input support device 3 in a plane is fixed. In the following explanation, the detection electrode DE facing the first electrode 31 is expressed as the first detection electrode DEa, and the detection electrodes DE provided at positions overlapping with the input support device 3 and not facing the first electrode 31 are expressed as the second detection electrodes DEb. The second electrode 32 is arranged so as to be movable above the second detection electrodes DEb. The second electrode 32 is arranged so as to face one or more second detection electrodes DEb. The detection electrodes DE provided at positions not overlapping with the input support device 3 can be expressed as third detection electrodes (touch detection electrodes). The display IC 50 previously stores therein the positions and the numbers of the first detection electrodes DEa and the second detection electrodes DEb among the detection electrodes DE. In the embodiment, the detection electrodes DE (the first detection electrode DEa and the second detection electrodes DEb) overlapping with the input support device 3 and the detection electrodes DE (third detection electrodes) not overlapping with the input support device 3 are formed to have the same square shape and are arrayed in a matrix with a row-column configuration.

Figure 7:
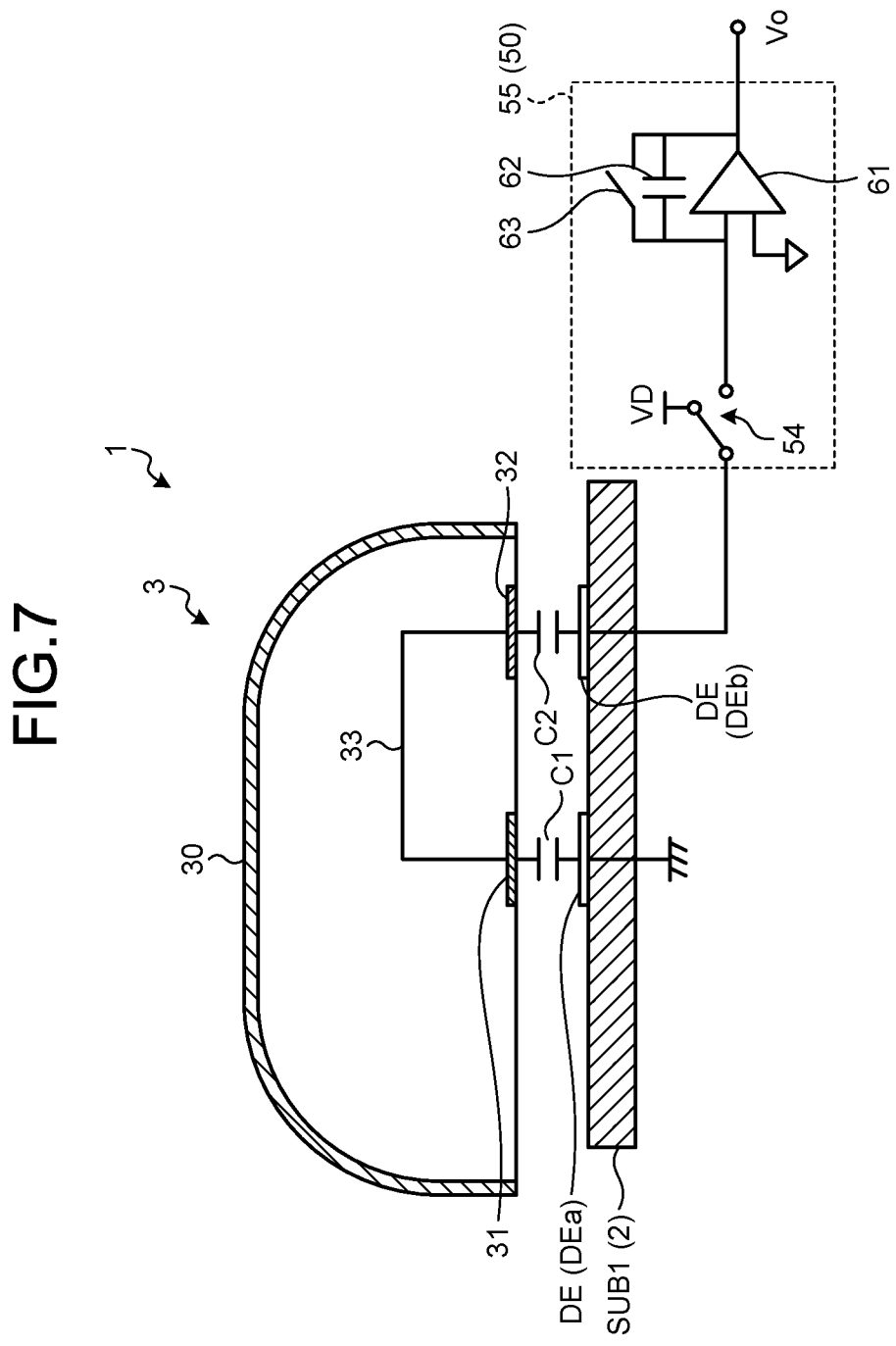
FIG. 7 is a descriptive view for explaining a method for detecting the input support device.

FIG. 7 is a descriptive view for explaining the method for detecting the input support device. As illustrated in FIG. 7, each of the first electrode 31 and the second electrode 32 of the input support device 3 is arranged so as to face the detection electrode DE of the array substrate SUB1.

The drive signal supply circuit 56 supplies the reference potential GND to the first detection electrode DEa facing the first electrode 31. The reference potential GND is, for example, a ground potential. The reference potential GND is, however, not limited thereto and may be a predetermined fixed potential. The drive signal supply circuit 56 supplies the detection drive signal VD to the second detection electrodes DEb. The detection drive signal VD has alternating-current (AC) rectangular waves, and a high-level potential and a low-level potential are alternately applied repeatedly at a predetermined frequency. The detection drive signal VD is supplied to the second detection electrodes DEb including the second detection electrodes DEb facing the second electrode 32 and the second detection electrodes DEb not facing the second electrode 32 simultaneously.

Capacitance C1 is formed between the first electrode 31 and the first detection electrode DEa facing the first electrode 31. Capacitance C2 is formed between the second electrode 32 and the second detection electrodes DEb facing the second electrode 32. Capacitive coupling by the capacitance C1 and the capacitance C2 is made between the first electrode 31 and the second electrode 32 through the coupling portion 33.

The second detection electrodes DEb output the detection signals Vdet based on the self-electrostatic capacitance. To be specific, the second detection electrodes DEb output, to the detection circuit 55, the detection signals Vdet in accordance with change in the capacitance C2. That is to say, the amplitudes of the detection signals Vdet from the second detection electrodes DEb overlapping with the second electrode 32 are different from the amplitudes of the detection signals Vdet from the second detection electrodes DEb not overlapping with the second electrode 32.

The detection circuit 55 is a signal processing circuit provided in the display IC 50, and receives the detection signals Vdet output from the detection electrodes DE (second detection electrodes DEb) and performs predetermined signal processing thereon to deliver output signals Vo. The detection circuit 55 includes a detection signal amplifier 61, a capacitive element 62, and a reset switch 63. The detection circuit 55 is not limited thereto and may include an A/D conversion circuit (not illustrated) that converts an analog signal output from the detection signal amplifier 61 into a digital signal.

The second detection electrodes DEb are coupled to the detection circuit 55 with an operation of a switch element 54 in a period differing from a period in which the detection drive signal VD is supplied. The detection signal amplifier 61 of the detection circuit 55 amplifies the detection signals Vdet supplied from the second detection electrodes DEb. A reference voltage having a fixed potential is input to a non-inversion input portion of the detection signal amplifier 61, and the detection electrodes DE are coupled to an inversion input terminal thereof. For example, the ground potential is input as the reference voltage in the embodiment. The detection circuit 55 can reset charges of the capacitive element 62 by turning the reset switch 63 on.

The potential of the output signal Vo from the detection circuit 55 is different between the second detection electrodes DEb overlapping with the second electrode 32 and the second detection electrodes DEb not overlapping with the second electrode 32. The display IC 50 can detect a position of the second electrode 32 (the rotation operation RT of the input support device 3) based on the output signals Vo.

As described above, the input detection system 1 is configured such that the reference potential GND is supplied to the first detection electrode DEa corresponding to the first electrode 31 and the detection drive signal VD is supplied to the second detection electrodes DEb corresponding to the second electrode 32. The capacitive coupling is made between the first electrode 31 and the second electrode 32 through the coupling portion 33, and the input detection system 1 can preferably detect the input support device 3 based on the change in the self-electrostatic capacitance.

On the other hand, in touch detection of detecting the object to be detected such as the finger Fg differing from the input support device 3, the drive signal supply circuit 56 supplies the detection drive signal VD to the detection electrodes DE (third detection electrodes) not overlapping with the input support device 3. When the finger Fg or the like makes contact with or close to the upper surface 111a (see FIG. 1), the detection signals Vdet vary in accordance with change in the self-electrostatic capacitance. Similarly to detection of the input support device 3, the detection signals Vdet are supplied to the detection circuit 55 from the detection electrodes DE, and the output signals Vo are output. The display IC 50 can detect the object to be detected such as the finger Fg based on the output signals Vo. That is to say, the second detection electrodes DEb are electrodes for detecting the rotation position of the input support device 3, and the detection electrodes DE (third detection electrodes) differing from the first detection electrode DEa and the second detection electrodes DEb are touch detection electrodes.

Figure 8:
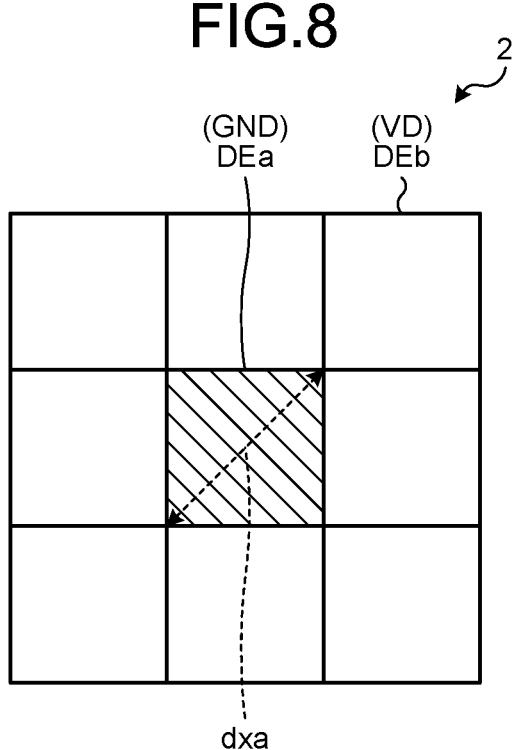
FIG. 8 is a plan view schematically illustrating parts of a first detection electrode and second detection electrodes in an enlarged manner.

Next, a detail positional relation between the input support device 3, and the first detection electrode DEa and the second detection electrodes DEb will be described. FIG. 8 is a plan view schematically illustrating parts of the first detection electrode and the second detection electrodes in an enlarged manner. In FIG. 8, the first detection electrode DEa is hatched. As illustrated in FIG. 8, a maximum width dxa of the first detection electrode DEa is equal to the length of a diagonal line of the first detection electrode DEa. In the embodiment, the second detection electrodes DEb have the same shape and size as those of the first detection electrode DEa. A maximum width of each of the second detection electrodes DEb is equal to the maximum width dxa of the first detection electrode DEa.

Figure 6:
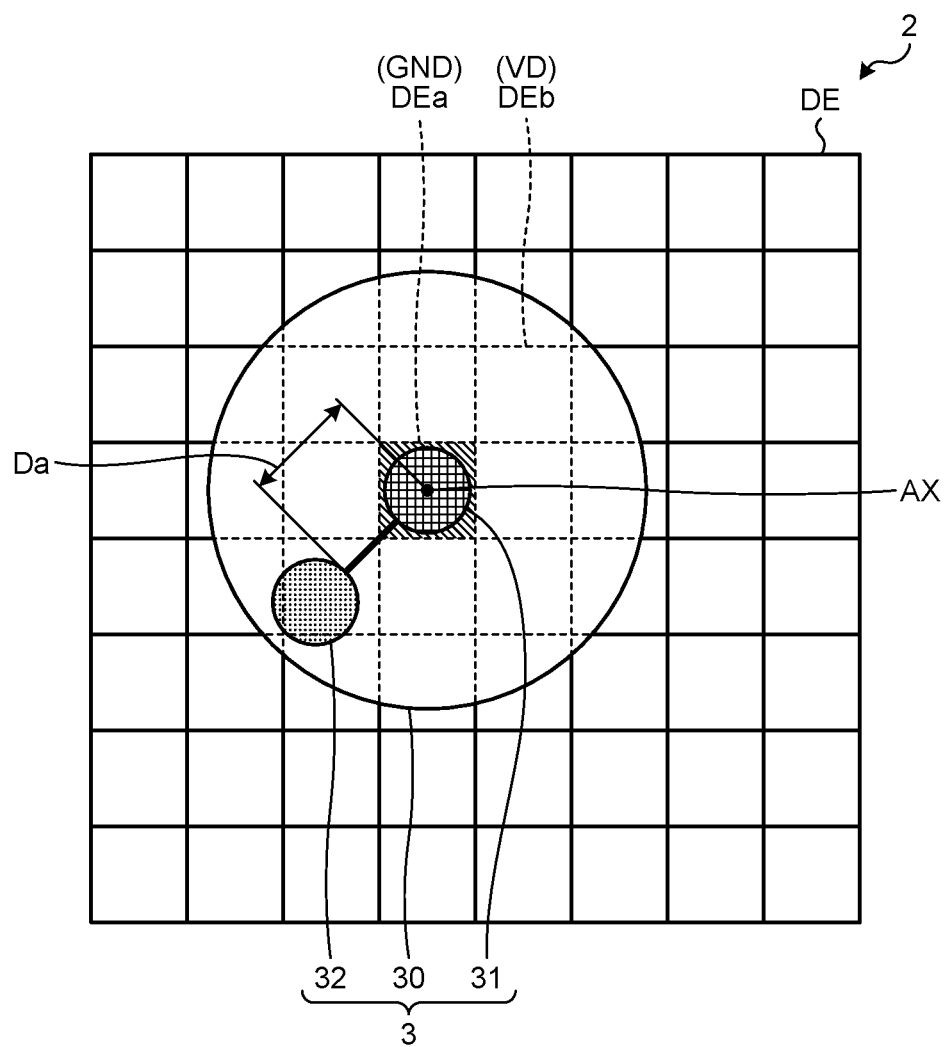
FIG. 6 is a plan view schematically illustrating an input support device and a plurality of detection electrodes.

As illustrated in FIG. 6, a distance between the first electrode 31 and the second electrode 32 of the input support device 3 is assumed to be a distance Da. The distance Da indicates the shortest distance between the center (rotating axis AX) of the first electrode 31 and the outer circumference of the second electrode 32. When the first electrode 31 is arranged at the substantially center of the first detection electrode DEa, the distance Da preferably satisfies the following equation (1).

$$Da > dxa/2 \quad (1)$$

The distance Da satisfies the following equation (2) more preferably in consideration of variation in a fixing position of the input support device 3, that is, positional variation of the first electrode 31.

$$Da > dxa \quad (2)$$

The first electrode 31 and the second electrode 32 are thereby arranged so as to overlap with different detection electrodes DE (the first detection electrode DEa and the second detection electrodes DEb). Accordingly, the capacitive coupling is made between the first electrode 31 and the second electrode 32 as described above, so that the input detection system 1 can preferably detect the input support device 3. In FIG. 6, overlapping ratios of the second electrode 32 with the detection electrodes DEb are known by detecting the intensities of the signals from the detection electrodes DEb overlapping with the second electrode 32, thereby achieving detection with high accuracy.

First Modification

Figure 9:
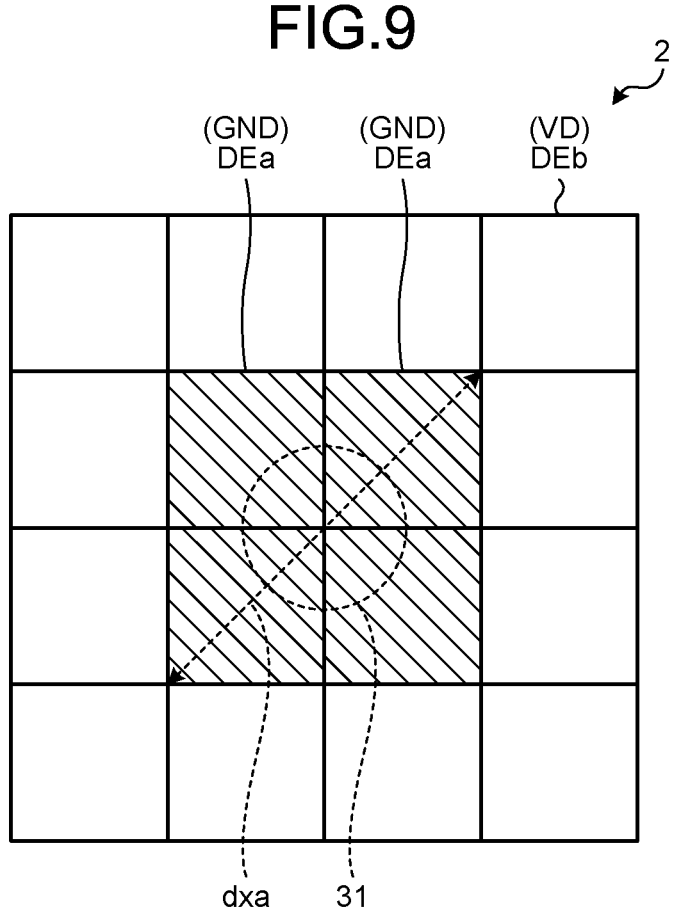
FIG. 9 is a plan view schematically illustrating, in an enlarged manner, parts of first detection electrodes and second detection electrodes in a first modification.

FIG. 9 is a plan view schematically illustrating, in an enlarged manner, parts of first detection electrodes and second detection electrodes in a first modification. In the following explanation, the same reference numerals denote the same components described in the above-mentioned embodiment and overlapped explanation thereof is omitted. In FIG. 9, the first electrode 31 is indicated by a dotted circle for making the drawing easy to view.

The first electrode 31 is arranged so as to overlap with the first detection electrodes DEa in the first modification. Four first detection electrodes DEa are arrayed in two rows and two columns. The drive signal supply circuit 56 supplies the reference potential GND to the first detection electrodes DEa facing the first electrode 31. In this case, a maximum width dxa corresponds to the length of a diagonal line of the first detection electrodes DEa. Also in this modification, the distance Da between the first electrode 31 and the second electrode 32 preferably satisfies the above-mentioned equation (1) or equation (2). In FIG. 9, the first electrode 31 is arranged so as to overlap with the four first detection electrodes DEa. The first electrode 31 is, however, not limited to being arranged in this manner and may be arranged so as to overlap with two, three, or equal to or more than five first detection electrodes DEa.

Second Modification

Figure 10:
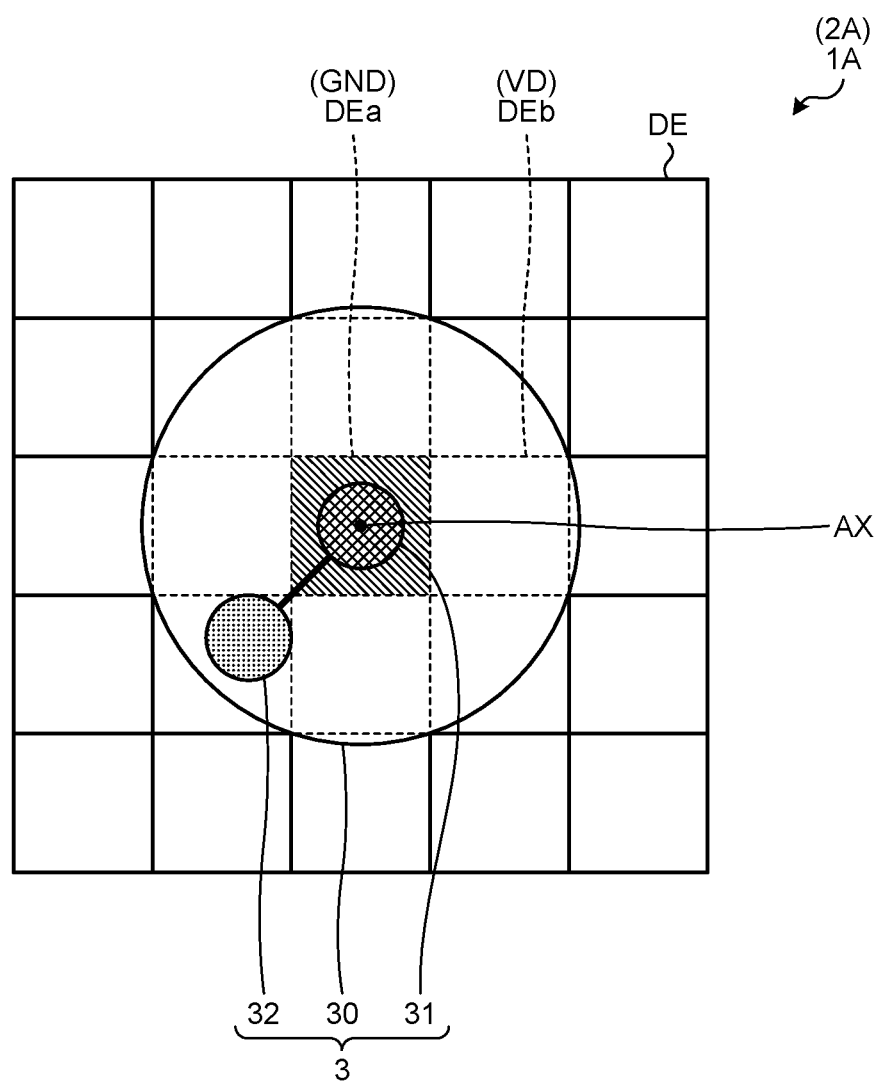
FIG. 10 is a plan view schematically illustrating an input support device and a plurality of detection electrodes in a second modification.

FIG. 10 is a plan view schematically illustrating an input support device and a plurality of detection electrodes in a second modification. As illustrated in FIG. 10, an input detection system 1A in the second modification is different from that in the above-mentioned first embodiment in an arrangement pitch of the detection electrodes DE of a display device 2A. To be specific, in the first embodiment illustrated in FIG. 6, the input support device 3 is arranged so as to overlap with the detection electrodes DE (the first detection electrode DEa and the second detection electrodes DEb) of five rows and five columns, that is, 25 detection electrodes DE in total. On the other hand, in FIG. 10, the input support device 3 is arranged so as to overlap with the detection electrodes DE (the first detection electrode DEa and the second detection electrodes DEb) of three rows and three columns, that is, nine detection electrodes DE in total.

In the second modification, the number of second detection electrodes DEb above which the second electrode 32 of the input support device 3 is movable is eight and is smaller than that in the first embodiment (FIG. 6). The input detection system 1A in the second modification has an advantage in that the input support device 3 can be reduced in size though detection accuracy (resolution) is lower in comparison with the first embodiment. Although the number of detection electrodes DE overlapping with the input support device 3 is small as an example in FIG. 10, the input support device 3 may overlap with a large number of detection electrodes DE as many as equal to or more than 25 detection electrodes DE. The input detection systems 1 and 1A can appropriately change an arrangement relation between the input support device 3 and the detection electrodes DE in accordance with required detection accuracy (detection resolution). Also in FIG. 10, overlapping ratios of the second electrode 32 with the detection electrodes DEb are known by detecting the intensities of the signals from the detection electrodes DEb overlapping with the second electrode 32, thereby achieving detection with high accuracy.

Second Embodiment

Figure 11:
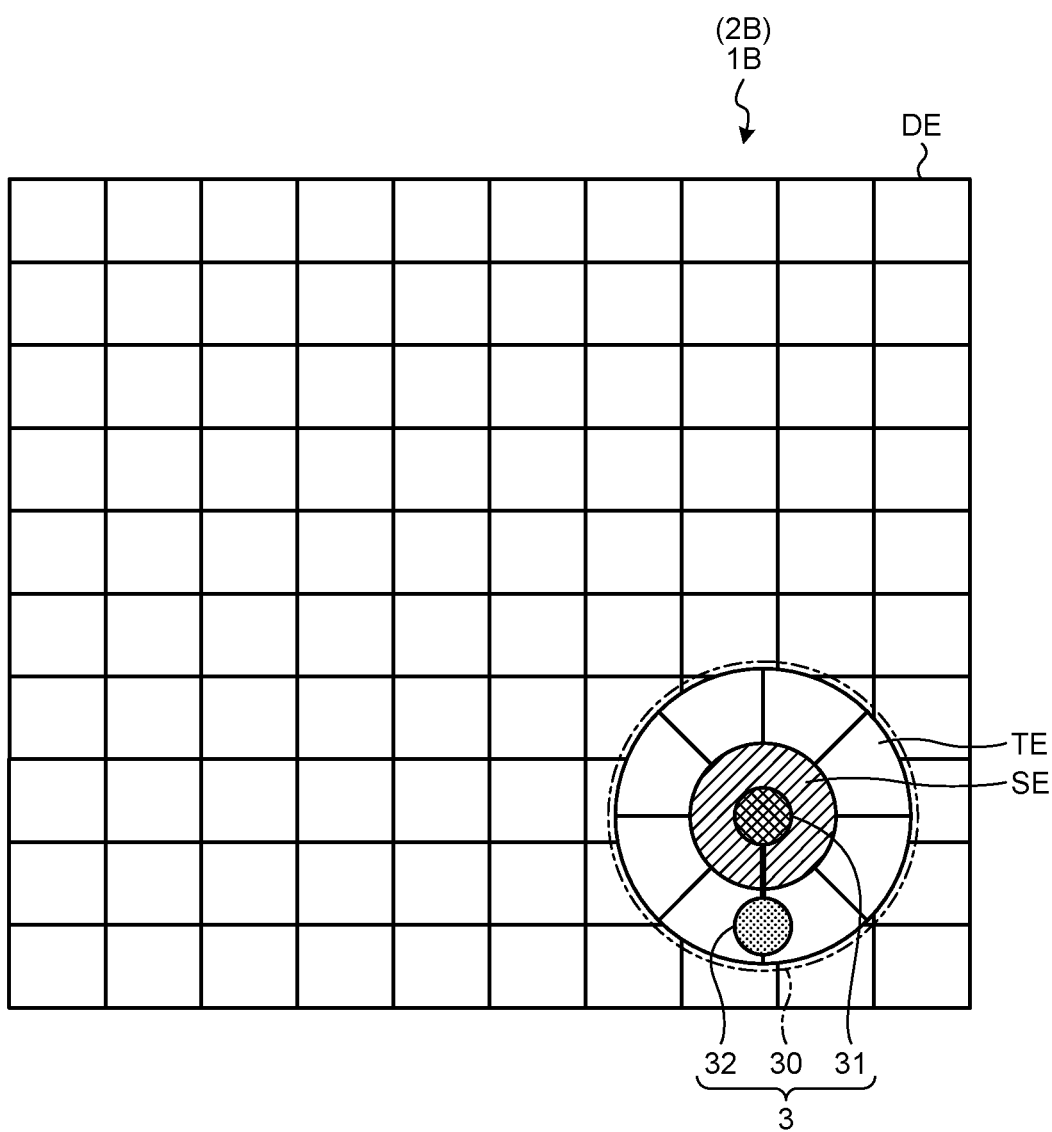
FIG. 11 is a plan view schematically illustrating an input support device and a plurality of detection electrodes in an input detection system according to a second embodiment.
Figure 12:
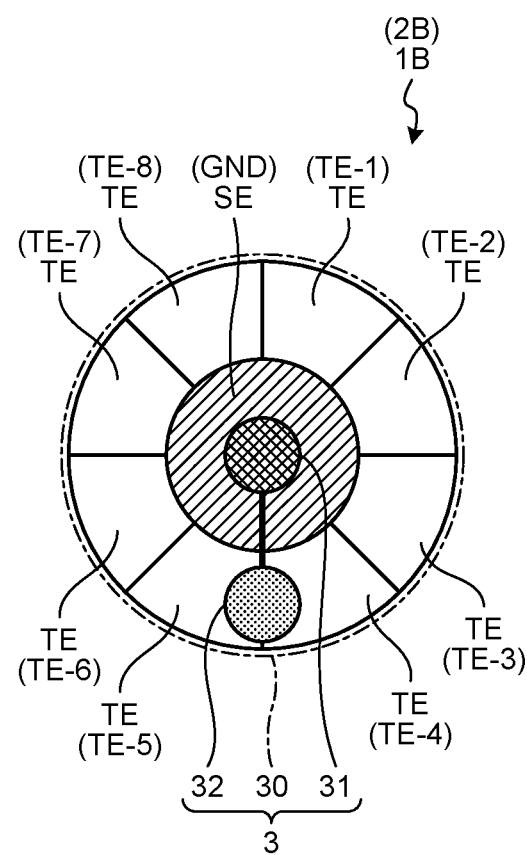
FIG. 12 is a plan view schematically illustrating, in an enlarged manner, a first detection electrode and second detection electrodes in the input support device in FIG. 11.

FIG. 11 is a plan view schematically illustrating an input support device and a plurality of detection electrodes in an input detection system according to a second embodiment. FIG. 12 is a plan view schematically illustrating, in an enlarged manner, a first detection electrode and second detection electrodes in the input support device in FIG. 11. As illustrated in FIG. 11 and FIG. 12, in an input detection system 1B (display device 2B) in the second embodiment, a first detection electrode SE and second detection electrodes TE overlapping with the input support device 3 have shapes differing from that of the detection electrodes DE not overlapping with the input support device 3.

The first detection electrode SE has a circular shape, and the second detection electrodes TE are arrayed in a ring shape while surrounding the first detection electrode SE. The detection electrodes DE are arrayed in a matrix with a row-column configuration. The detection electrodes DE adjacent to the second detection electrodes TE, however, have curved portions formed by cutting parts of the outer shapes thereof along the shapes of the second detection electrodes TE. The first detection electrode SE and the second detection electrodes TE are provided in the same layer as the detection electrodes DE are and are made of the same material.

As illustrated in FIG. 12, eight second detection electrodes TE-1, TE-2, TE-3, TE-4, TE-5, TE-6, TE-7, and TE-8 are arrayed in the clockwise direction around the first detection electrode SE. In the following explanation, when the second detection electrodes TE-1, TE-2, TE-3, TE-4, TE-5, TE-6, TE-7, and TE-8 need not be distinguished from each other for explanation, they are referred to as second detection electrodes TE simply. The first electrode 31 is arranged so as to face the first detection electrode SE, and the second electrode 32 is arranged so as to be movable above eight second detection electrodes TE. The second electrode 32 is arranged so as to face one or more second detection electrodes TE.

In the embodiment, the first detection electrode SE and the second detection electrodes TE are provided so as to conform to the shape and size of the input support device 3. That is to say, the first detection electrode SE is an electrode configured to receive supply of the reference potential GND, the second detection electrodes TE are electrodes configured to receive supply of the detection drive signal VD and detect the rotation position (rotation operation RT) of the input support device 3, and the detection electrodes DE (third detection electrodes) are touch detection electrodes. The input detection system 1B can thereby detect the input support device 3 preferably.

Figure 13:
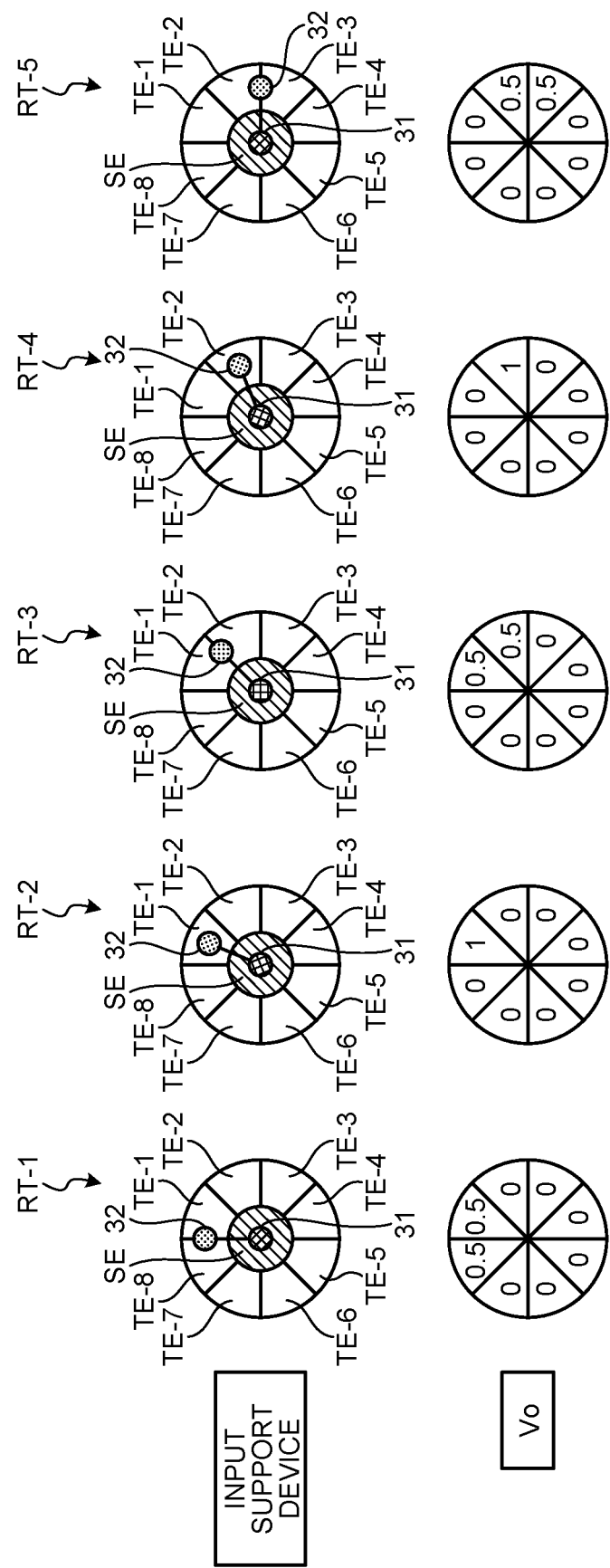
FIG. 13 is a descriptive view for explaining detection resolution of the input support device in the second embodiment.

FIG. 13 is a descriptive view for explaining detection resolution of the input support device in the second embodiment. FIG. 13 illustrates a relation between a positional relation of the first electrode 31 and the second electrode 32 of the input support device 3 (upper drawings in FIG. 13) and values of the output signals Vo output from the second detection electrodes TE (lower drawings in FIG. 13) for each of a rotation operation RT-1 to a rotation operation RT-5 of the input support device 3. As the output signals Vo illustrated in FIG. 13, the output signal Vo when the entire second electrode 32 overlaps with one second detection electrode TE is expressed as "1", the output signal Vo when the second electrode 32 overlaps with the boundary of two second detection electrodes TE is expressed as "0.5", and the output signal Vo when the second electrode 32 does not overlap with the second detection electrode TE is expressed as "0".

As illustrated in FIG. 13, the second electrode 32 overlaps with the boundary between the two second detection electrodes TE-1 and TE-8 with the rotation operation RT-1. Each of the second detection electrodes TE-1 and TE-8 outputs the output signal Vo of 0.5.

The second electrode 32 overlaps with one second detection electrode TE-1 with the rotation operation RT-2. The second detection electrode TE-1 outputs the output signal Vo of 1.

The second electrode 32 overlaps with the boundary between the two second detection electrodes TE-1 and TE-2 with the rotation operation RT-3. Each of the second detection electrodes TE-1 and TE-2 outputs the output signal Vo of 0.5.

The second electrode 32 overlaps with one second detection electrode TE-2 with the rotation operation RT-4. The second detection electrode TE-2 outputs the output signal Vo of 1.

The second electrode 32 overlaps with the boundary between the two second detection electrodes TE-2 and TE-3 with the rotation operation RT-5. Each of the second detection electrodes TE-2 and TE-3 outputs the output signal Vo of 0.5.

Subsequently, the second electrode 32 moves with the rotation operations RT of the input support device 3 similarly. Each of the second detection electrode TE-3 to the second detection electrode TE-8 outputs the output signal Vo in accordance with the position of the second electrode 32 with each rotation operation RT. In the example illustrated in FIG. 13, the number of second detection electrodes TE above which the second electrode 32 is movable is eight, and the detection resolution of the input support device 3 is approximately 360/16=22.5°. Also in FIG. 13, overlapping ratios of the second electrode 32 with the second detection electrodes TE are known by detecting the intensities of the signals from the second detection electrodes TE overlapping with the second electrode 32, thereby achieving detection with high accuracy.

Third Modification

Figure 14:
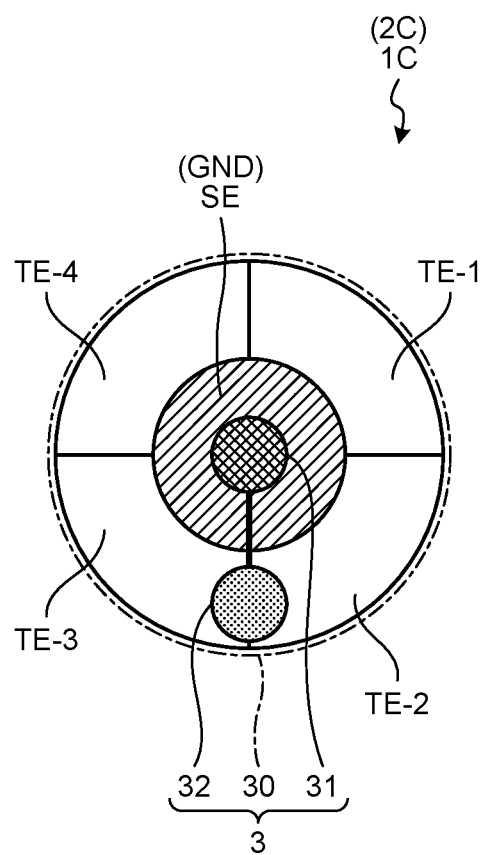
FIG. 14 is a plan view schematically illustrating, in an enlarged manner, a first detection electrode and second detection electrodes in an input support device in a third modification.

FIG. 14 is a plan view schematically illustrating, in an enlarged manner, a first detection electrode and second detection electrodes in an input support device in a third modification. As illustrated in FIG. 14, in an input detection system 1C (display device 2C) in the third modification, the number of second detection electrodes TE is smaller than that in the above-mentioned second embodiment. In the third modification, four second detection electrodes TE-1, TE-2, TE-3, and TE-4 are arrayed in the clockwise direction around the first detection electrode SE. In other words, the area of one second detection electrode TE in the third modification is about twice as large as the area of one second detection electrode TE in the second embodiment.

Figure 15:
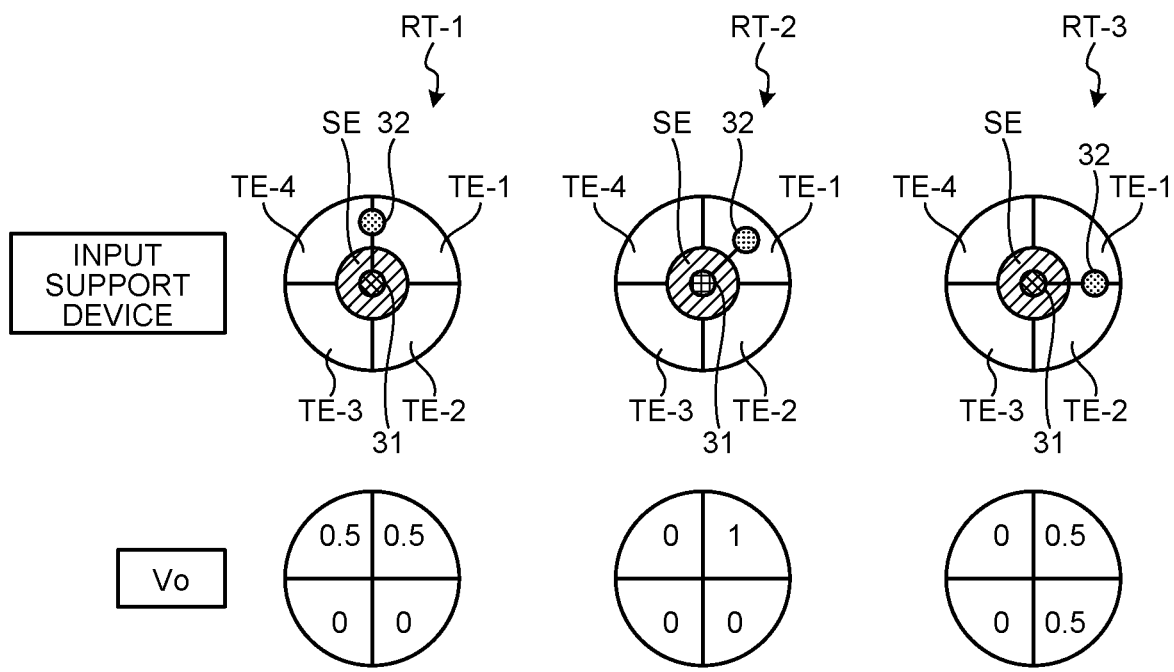
FIG. 15 is a descriptive view for explaining detection resolution of the input support device in the third modification.

FIG. 15 is a descriptive view for explaining detection resolution of the input support device in the third modification. As illustrated in FIG. 15, the second electrode 32 overlaps with the boundary between the two second detection electrodes TE-1 and TE-4 with the rotation operation RT-1. Each of the second detection electrodes TE-1 and TE-4 outputs the output signal Vo of 0.5.

The second electrode 32 overlaps with one second detection electrode TE-1 with the rotation operation RT-2. The second detection electrode TE-1 outputs the output signal Vo of 1.

The second electrode 32 overlaps with the boundary between the two second detection electrodes TE-1 and TE-2 with the rotation operation RT-3. Each of the second detection electrodes TE-1 and TE-2 outputs the output signal Vo of 0.5.

Subsequently, the second electrode 32 moves with the rotation operations RT of the input support device 3 similarly. Each of the second detection electrodes TE-3 and TE-4 outputs the output signal Vo in accordance with the position of the second electrode 32 with each rotation operation RT. In the third modification illustrated in FIG. 15, the number of second detection electrodes TE above which the second electrode 32 is movable is four, and the detection resolution of the input support device 3 is approximately 360/8=45°. Also in FIG. 15, overlapping ratios of the second electrode 32 with the second detection electrodes TE are known by detecting the intensities of the signals from the second detection electrodes TE overlapping with the second electrode 32, thereby achieving detection with high accuracy.

The number of second detection electrodes TE is not limited to four or eight, and may be five, six, seven, or equal to or more than nine and can be appropriately changed in accordance with required detection resolution.

Next, a calibration mode and a method for detecting the rotation operation RT in the input detection systems 1, 1A, 1B, and 1C will be described. Although the following explains the input detection system 1B in the second embodiment, it can be applied also to the input detection systems 1, 1A, and 1C in the first embodiment and the modifications.

Figure 16:
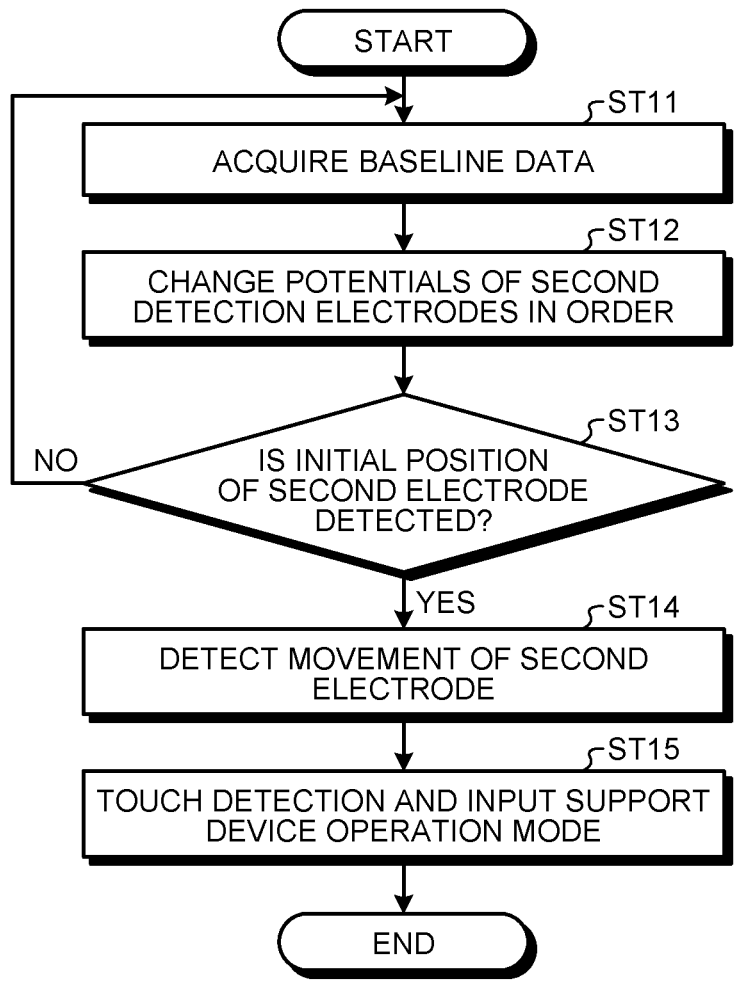
FIG. 16 is a flowchart for explaining a method for detecting the input support device in the input detection system in the second embodiment.
Figure 17:
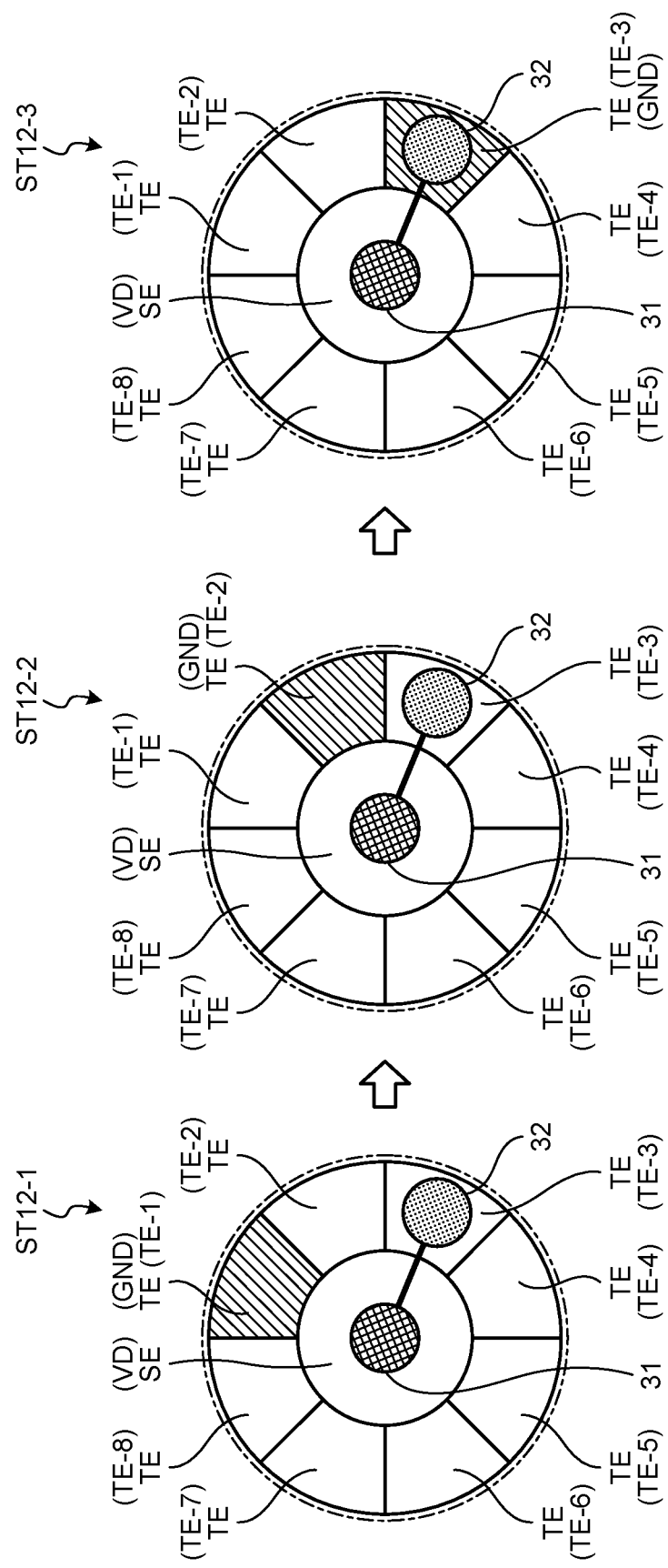
FIG. 17 is a descriptive view for explaining a method for detecting an initial position of a second electrode in the input detection system in the second embodiment.

FIG. 16 is a flowchart for explaining a method for detecting the input support device in the input detection system in the second embodiment. FIG. 17 is a descriptive view for explaining a method for detecting an initial position of the second electrode in the input detection system in the second embodiment.

In the input detection system 1B, the calibration mode (step ST11 to step ST13) is executed in a state where the input support device 3 is arranged, as illustrated in FIG. 16. The input detection system 1B executes processing of the calibration mode when the display device 2B is powered on, for example.

In the calibration mode, the detection electrodes DE, the first detection electrode SE, and the second detection electrodes TE are driven in a state where there is no object to be detected such as the finger Fg, and the output signals Vo output from the detection electrodes DE, the first detection electrode SE, and the second detection electrodes TE are acquired as baselines (step ST11). The input detection system 1B executes the processing of the calibration mode when the display device 2B is powered on or in an idling state (a power saving mode in which the input detection system 1B shifts when the finger Fg is not detected for several seconds), for example.

Subsequently, the display IC 50 (drive signal supply circuit 56) sequentially changes the potentials of the second detection electrodes TE (step ST12). The display IC 50 then detects the initial position of the second electrode 32 based on the output signal Vo output from the first detection electrode SE (step ST13). To be specific, as illustrated in FIG. 17, the reference potential GND is supplied to one second detection electrode TE, and the detection drive signal VD is supplied to the other second detection electrodes TE and the first detection electrode SE. FIG. 17 explains the case where the initial position of the second electrode 32 overlaps with the second detection electrode TE-3.

As illustrated in FIG. 17, when the reference potential GND is supplied to the second detection electrode TE-1 (step ST12-1), the same detection drive signal VD is supplied to the first detection electrode SE facing the first electrode 31 and the second detection electrode TE-3 facing the second electrode 32. In this case, the first electrode 31 and the second electrode 32 have the same potential, and the initial position of the second electrode 32 cannot be detected (No at step ST13).

Thereafter, when the reference potential GND is supplied to the second detection electrode TE-2 (step ST12-2), the same detection drive signal VD is supplied to the first detection electrode SE facing the first electrode 31 and the second detection electrode TE-3 facing the second electrode 32. In this case, the initial position of the second electrode 32 cannot be detected (No at step ST13).

Subsequently, when the reference potential GND is supplied to the second detection electrode TE-3 (step ST12-3), different potentials (the detection drive signal VD and the reference potential GND) are supplied respectively to the first detection electrode SE facing the first electrode 31 and the second detection electrode TE-3 facing the second electrode 32. In this case, the display IC 50 can detect the initial position of the second electrode 32 based on the output signal Vo output from the first detection electrode SE (Yes at step ST13).

Although the reference potential GND is supplied to the second detection electrode TE-1 to the second detection electrode TE-3 as an example in FIG. 17, the reference potential GND may be sequentially supplied to all of the second detection electrode TE-1 to the second detection electrode TE-8. In this case, the initial position of the second electrode 32 may be detected based on eight output signals Vo when the reference potential GND is supplied to each of the second detection electrode TE-1 to the second detection electrode TE-8.

Figure 18:
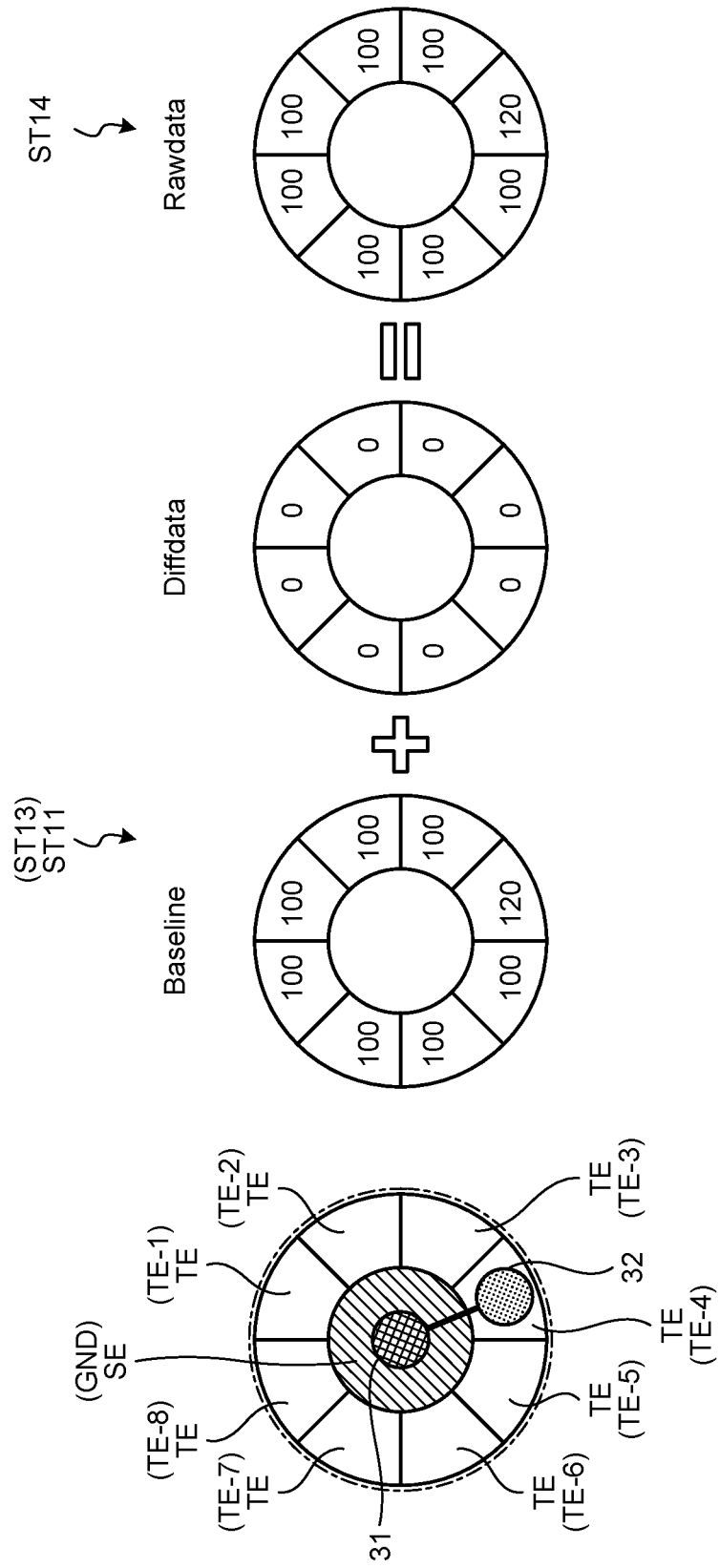
FIG. 18 is a descriptive view for explaining a method for detecting movement of the second electrode in the input detection system in the second embodiment.

Returning to FIG. 16, when the initial position of the second electrode 32 can be detected, the input detection system 1B finishes the calibration mode and executes detection of movement of the second electrode 32 (step ST14). FIG. 18 is a descriptive view for explaining a method for detecting the movement of the second electrode in the input detection system in the second embodiment. The detection of the movement of the second electrode 32 is performed in such a manner that the reference potential GND is supplied to the first detection electrode SE and the detection drive signal VD is supplied to the second detection electrodes TE. In the detection of the movement of the second electrode 32, pieces of raw data (Rawdata) acquired from the output signals Vo are set to be used while no differential data (Diffdata) is used. The second electrode 32 can thereby be preferably detected even when variation occurs in the baselines of the second detection electrodes TE. The baseline (Baseline) is data based on the output signal Vo in the initial state that is provided in the above-mentioned calibration mode. The differential data is data on a differential between the raw data (output signal Vo) and the baseline.

As an example of the method for detecting the second electrode 32 using the pieces of raw data, the signal processing circuit 57 (see FIG. 5) of the display IC 50 calculates an average value of the pieces of raw data (output signals Vo) from the second detection electrodes TE. In the example illustrated in FIG. 18, Vo=100, 100, 100, 120, 100, 100, 100, and 100 are provided as the pieces of raw data (output signals Vo). The signal processing circuit 57 calculates the average value Vave=(100+100+100+120+100+100+100+100)/8=102.5. The signal processing circuit 57 sets the calculated average value Vave as a threshold Vth. The signal processing circuit 57 compares the threshold Vth and each piece of raw data (output signal Vo) and sets, as the position of the second electrode 32, a position of the second detection electrode TE for which the raw data (output signal Vo) with a value larger than the threshold Vth is provided.

As another example of the method for detecting the second electrode 32 using the pieces of raw data, the signal processing circuit 57 (see FIG. 5) of the display IC 50 may compare a previously set threshold Vth and each piece of raw data. For example, when the baseline Vbs of the second detection electrode TE in the case of no second electrode 32 is assumed to satisfy Vbs=100, the signal processing circuit 57 stores therein the threshold Vth=110. The signal processing circuit 57 sets, as the position of the second electrode 32, the position of the second detection electrode TE for which the raw data with a value larger than the threshold Vth=110 is provided.

Thereafter, the input detection system 1B detects touch of the finger Fg or the like and the rotation operation RT of the input support device 3 (step ST15). The above-mentioned detection method is merely an example and can be appropriately modified.

Fourth Modification

Figure 19:
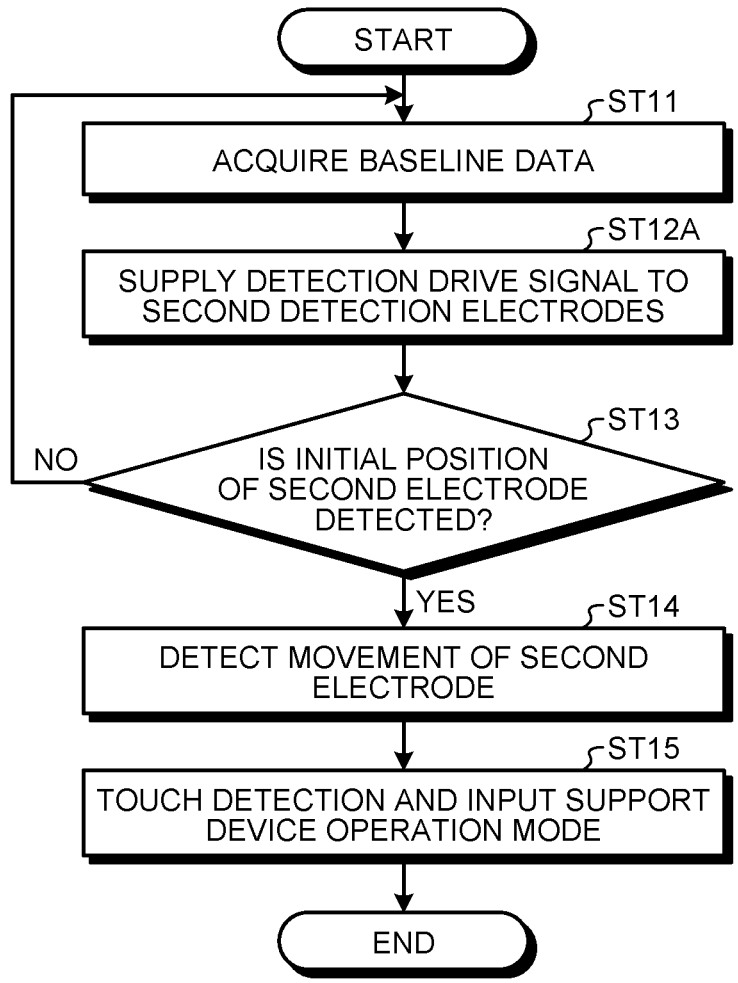
FIG. 19 is a flowchart for explaining a method for detecting an input support device in an input detection system in a fourth modification.
Figure 20:
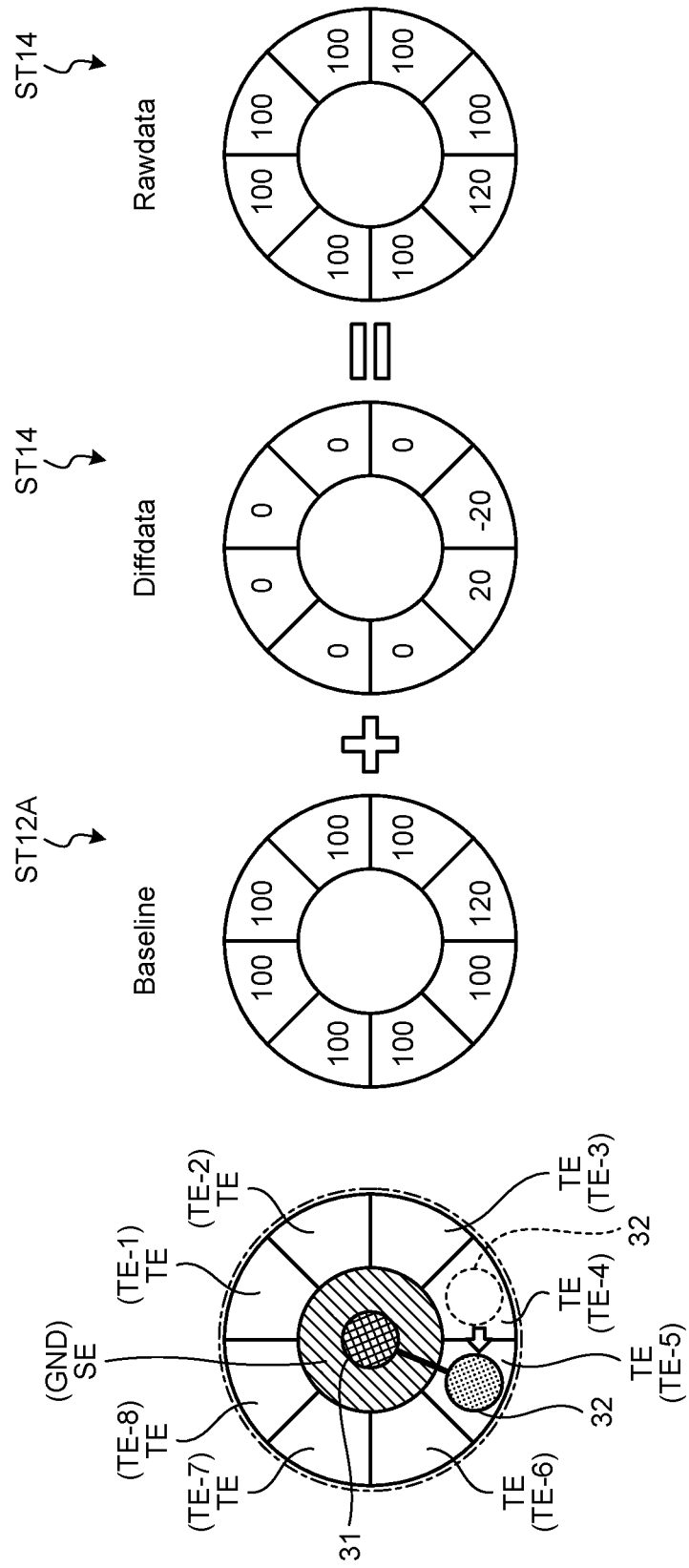
FIG. 20 is a descriptive view for explaining the method for detecting the input support device in the input detection system in the fourth modification.

FIG. 19 is a flowchart for explaining a method for detecting an input support device in an input detection system in a fourth modification. FIG. 20 is a descriptive view for explaining the method for detecting the input support device in the input detection system in the fourth modification. The method for detecting the input support device 3 in the fourth modification illustrated in FIG. 19 is different from the flowchart illustrated in FIG. 16 in a method for detecting an initial position of the second electrode 32 (steps ST12 and ST13 in FIG. 16).

In the fourth modification, the reference potential GND is supplied to the first detection electrode SE, and the detection drive signal VD is supplied to the second detection electrodes TE (step ST12A), as illustrated in FIG. 19. The baselines Vbs of the second detection electrodes TE are thereby provided as illustrated in FIG. 20. In the left view of FIG. 20, the second electrode 32 at the initial position is indicated by a dotted circle, and the second electrode 32 after the rotation operation RT is indicated by a solid circle.

In FIG. 20, the baselines Vbs of the second detection electrodes TE with which the second electrode 32 does not overlap are Vbs=100. The baselines Vbs of the second detection electrodes TE with which the second electrode 32 overlaps are Vbs=120. The signal processing circuit 57 calculates the average value Vbs–ave=(100+100+100+120+100+100+100+100)/8=102.5 of these baselines Vbs. The signal processing circuit 57 sets the calculated average value Vbs–ave as the threshold Vth. The signal processing circuit 57 compares the threshold Vth and each baseline Vbs and sets, as the initial position of the second electrode 32, a position of the second detection electrode TE for which the baseline Vbs with a value larger than the threshold Vth is provided.

As described above, in the calibration mode in the fourth modification, the position of the second detection electrode TE that has output the output signal Vo (baseline Vbs) the value of which is the largest relative to the average value of the output signals Vo (baselines Vbs) output from the second detection electrodes TE corresponding to the second electrode 32 is set as the initial position of the second electrode 32.

As another example of the method for detecting the initial position of the second electrode 32 using the baselines Vbs, the signal processing circuit 57 (see FIG. 5) of the display IC 50 may compare a previously set threshold Vth and each baseline Vbs. For example, when the baselines Vbs of the second detection electrodes TE in the case of no second electrode 32 are Vbs=100, the signal processing circuit 57 stores therein the threshold Vth=110. The signal processing circuit 57 sets, as the initial position of the second electrode 32, a position of the second detection electrode TE for which the baseline Vbs with a value larger than the threshold Vth=110 is provided.

In the detection of the movement of the second electrode 32 (step ST14), the pieces of differential data may be used or the pieces of raw data may be used. In the case of using the pieces of differential data, the signal processing circuit 57 (see FIG. 5) may compare the previously set threshold Vth and each differential data. For example, when the differential data Vdf of the second detection electrode TE with the second electrode 32 is assumed as Vdf=20, the signal processing circuit 57 stores therein the threshold Vth=10. The signal processing circuit 57 sets, as the position of the second electrode 32, a position of the second detection electrode TE for which the differential data Vdf with a value larger than the threshold Vth=10 is provided.

The signal processing circuit 57 may detect the position of the second electrode 32 using the pieces of raw data (output signal Vo) similarly to the above-mentioned example.

Fifth Modification

Figure 21:
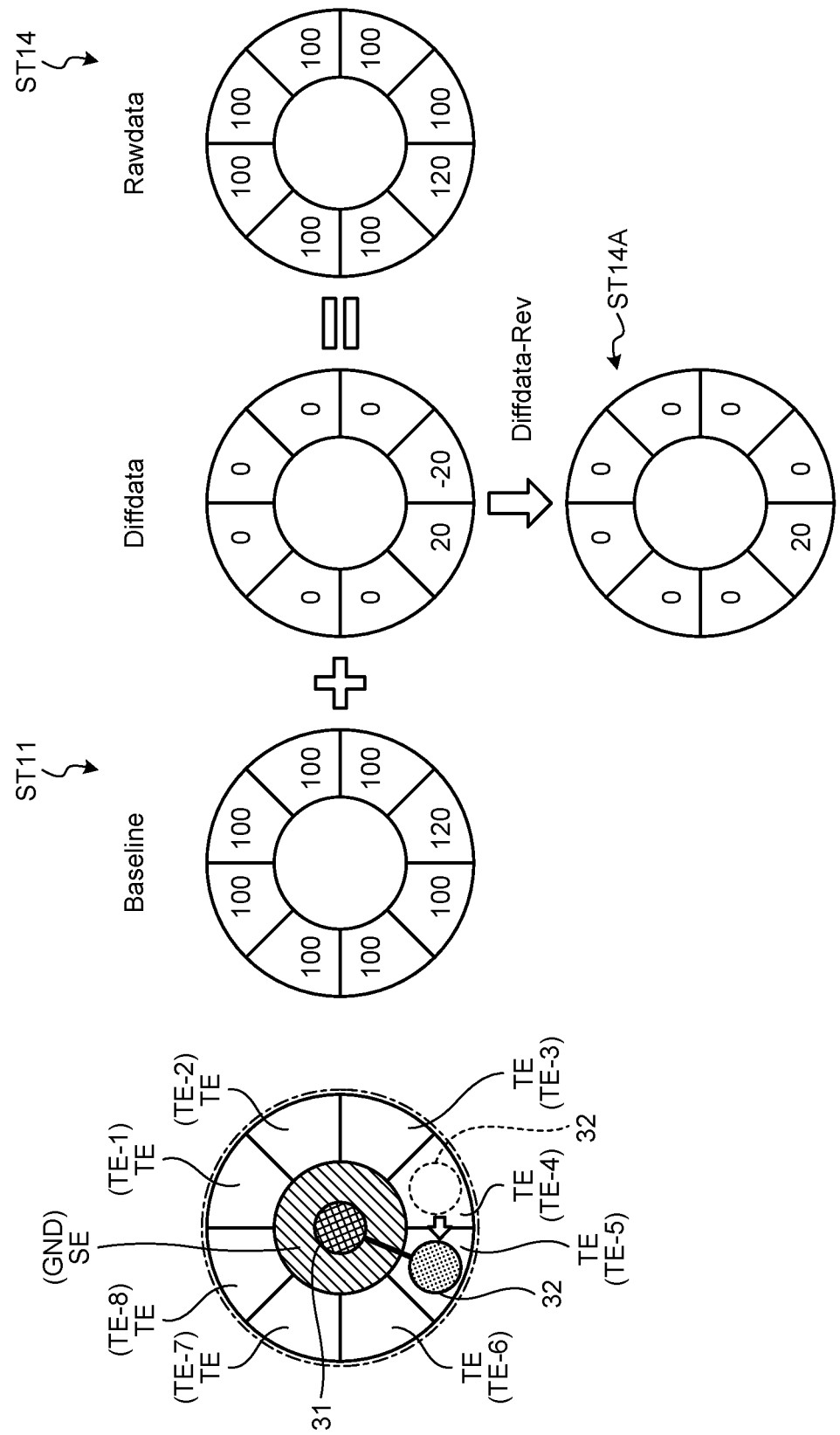
FIG. 21 is a descriptive view for explaining a method for detecting movement of a second electrode in an input detection system in a fifth modification.

FIG. 21 is a descriptive view for explaining a method for detecting movement of a second electrode in an input detection system in a fifth modification. When the previously set threshold Vth and each differential data Vdf are compared in the above-mentioned fourth modification, data having an opposite polarity (negative) is generated as the differential data Vdf corresponding to the second detection electrode TE-4. This is because variation occurs in values of the baselines in accordance with the initial position of the second electrode 32. In the fifth modification, the signal processing circuit 57 performs correction of replacing the differential data Vdf having the opposite polarity by Vdf=0 when the differential data Vdf having the opposite polarity is generated. The position of the second electrode 32 can thereby be detected with high accuracy by comparing the threshold Vth and each piece of differential data Vdf after the correction in the fifth modification.

Third Embodiment

Figure 22:
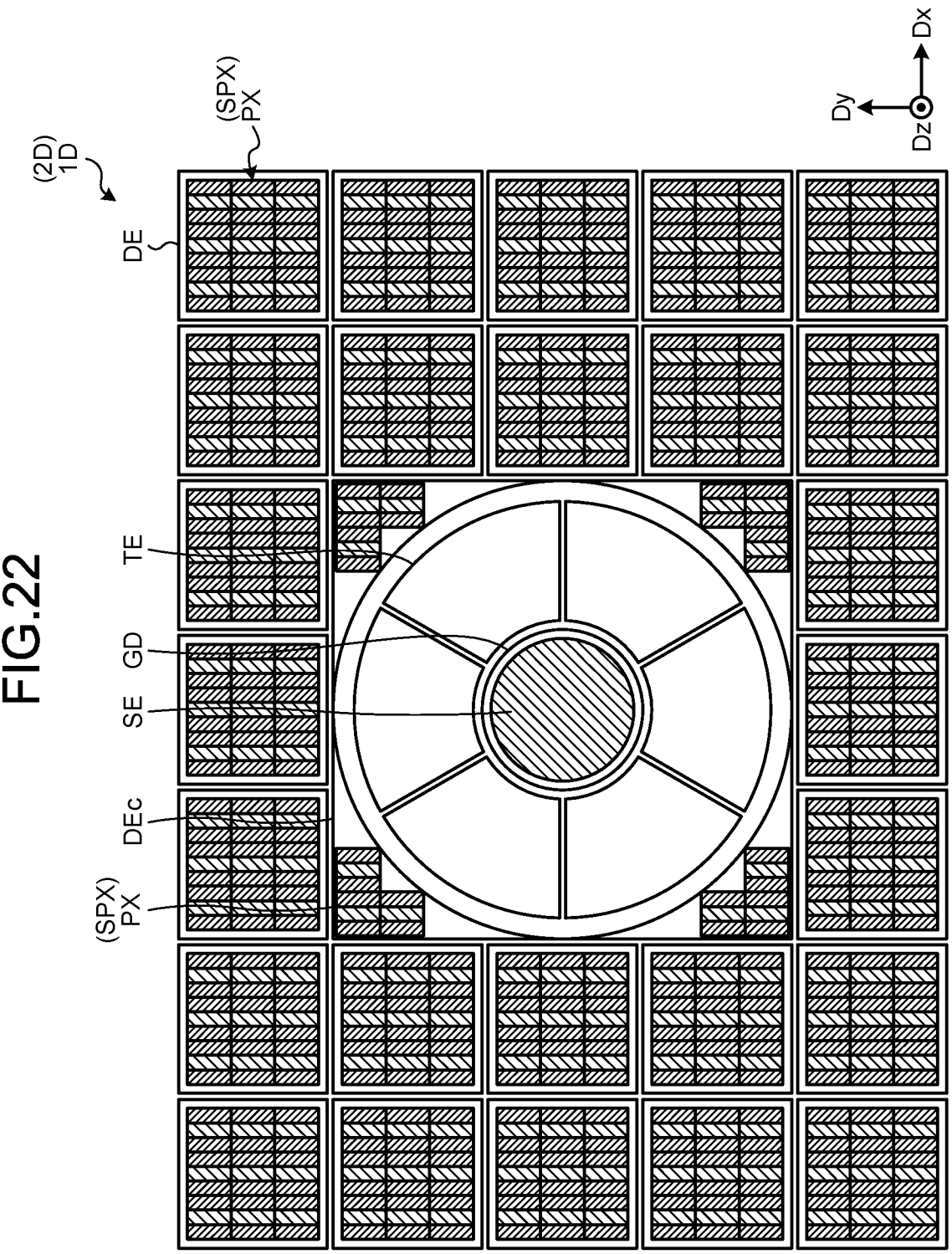
FIG. 22 is a plan view schematically illustrating a relation between a display device and an input support device in an input detection system according to a third embodiment.

FIG. 22 is a plan view schematically illustrating a relation between a display device and an input support device in an input detection system according to a third embodiment. As illustrated in FIG. 22, in an input detection system 1D in the third embodiment, guard wiring GD is provided between the first detection electrode SE and the second detection electrodes TE. The guard wiring GD is provided in a ring shape so as to surround the first detection electrode SE. The detection drive signal VD having the same potential as that of the second detection electrodes TE is supplied to the guard wiring GD. Parasitic capacitance between the first detection electrode SE, and the second detection electrodes TE around the first detection electrode SE and the detection electrodes DE can be reduced.

No pixel PX is provided in a region in which the first detection electrode SE, the second detection electrodes TE, and the guard wiring GD are provided. That is to say, a display device 2D does not display an image in a region overlapping with the input support device 3. Four detection electrodes DEc are provided around the second detection electrodes TE arrayed in the ring shape. The detection electrodes DEc have curved portions along the outer circumferences of the second detection electrodes TE and are provided between the detection electrodes DE arrayed in a matrix with a row-column configuration and the second detection electrodes TE. The detection electrodes DEc are provided so as to overlap with the pixels PX. In the display device 2D, the detection electrodes DE and DEc, the first detection electrode SE, and the second detection electrodes TE preferably have the same area. The detection electrodes DEc may also be divided so as to correspond to a pitch of the detection electrodes DE in order to improve touch accuracy.

In the display device 2D, the pixels PX may be provided on the entire display region DA. That is to say, the first detection electrode SE, the second detection electrodes TE, and the guard wiring GD may be provided so as to overlap with the pixels PX.

Fourth Embodiment

Figure 23:
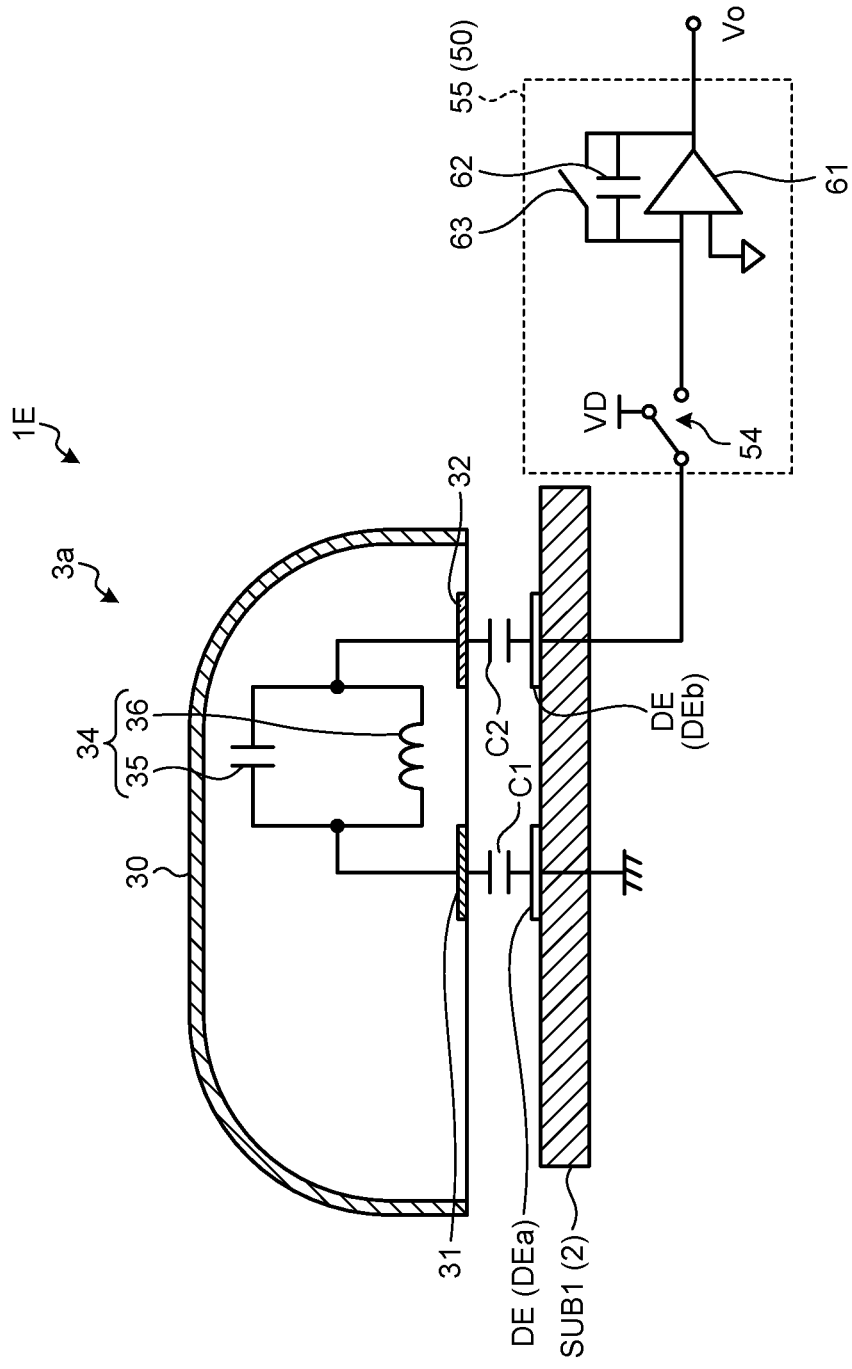
FIG. 23 is a descriptive view for explaining an input support device according to a fourth embodiment.

FIG. 23 is a descriptive view for explaining an input support device according to a fourth embodiment. As illustrated in FIG. 23, an input support device 3a in the fourth embodiment includes an LC circuit 34 as a coupling portion that electrically couples the first electrode 31 and the second electrode 32. The LC circuit 34 configures an LC resonance circuit in which a capacitor 35 and an inductor 36 are coupled in parallel with each other. The first electrode 31 is coupled to one end side of the LC circuit 34 (coupling part of the capacitor 35 and the inductor 36 on one end side). The second electrode 32 is coupled to the other end side of the LC circuit 34 (coupling part of the capacitor 35 and the inductor 36 on the other end side). An input detection system 1E can detect positions of the first electrode 31 and the second electrode 32 using LC resonance of the LC circuit 34.

Although the input detection systems 1, 1A, 1B, 1C, 1D, and 1E including the display device 2 having the detection function into which the touch sensor (detection device) and the display device are integrated have been described in the above-mentioned embodiments and modifications, the configuration is not limited thereto. The input detection systems 1, 1A, 1B, 1C, 1D, and 1E may have the configuration in which a detection device (for example, a touch panel) is overlapped above the display device 2 or may have the configuration in which the input support device 3 is mounted above a detection device (for example, a touch panel) without including the display device 2.

Although the preferred embodiments of the present disclosure have been described above, the present disclosure is not limited by these embodiments. Contents disclosed in the embodiments are merely examples, and various modifications can be made in a range without departing from the gist of the present disclosure. It is needless to say that appropriate modifications in a range without departing from the gist of the present disclosure belong to the technical scope of the present disclosure. At least one of various omission, replacement, and modification of the components can be performed in a range without departing from the gist of the embodiments and modifications described above.

What is claimed is:

1. An input detection system comprising: a detection device including a plurality of detection electrodes arrayed in a detection region; an input support device including
   a first input support electrode,
   a second input support electrode provided so as to be movable on a concentric circle about a rotating axis overlapping with the first input support electrode, and
   a coupling portion that electrically couples the first electrode and the second input support electrode;
   a first detection electrode provided so as to face the first input support electrode;
   a plurality of second detection electrodes provided at positions overlapping with the input support device and not facing the first input support electrode; and
   a plurality of third detection electrodes provided at positions not overlapping with the input support device, wherein a position of the rotating axis of the input support device is fixed to the detection region of the detection device, and in detection of the second input support electrode:
   a reference potential is supplied to one of the detection electrodes, the one corresponding to the first input support electrode; and
   a drive signal is supplied to another one of the detection electrodes, the other one another one of the detection electrodes corresponding to the second input support electrode.

2. The input detection system according to claim 1, wherein the detection electrodes overlapping with the input support device and the detection electrodes not overlapping with the input support device are arrayed in a matrix with a row-column configuration.

3. The input detection system according to claim 1, wherein
   the first detection electrode has a circular shape,
   the second detection electrodes are arrayed in a ring shape while surrounding the first detection electrode, and
   the third detection electrodes have square shapes and are arrayed in a matrix with a row-column configuration.

4. The input detection system according to claim 1, wherein
   the second detection electrodes are electrodes configured to detect a rotation position of the input support device, and
   the third detection electrodes are touch detection electrodes.

5. The input detection system according to claim 1, wherein the detection electrodes overlapping with the input support device and the detection electrodes not overlapping with the input support device are provided in the same layer.

6. The input detection system according to claim 1, having a calibration mode, wherein,
   in the calibration mode:
   a drive signal is supplied to one of the detection electrodes, the one corresponding to the first input support electrode; and
   a reference potential is sequentially supplied to each one of a plurality of the detection electrodes corresponding to the second input support electrode, the plurality of detection electrodes being different from the one of the detection electrodes.

7. The input detection system according to claim 1, having a calibration mode, wherein
   in the calibration mode, baselines containing output signals from the detection electrodes corresponding to the second input support electrode at an initial position are acquired, and
   in the detection of the second input support electrode after the calibration mode, the second input support electrode is detected based on the output signals output from the detection electrodes corresponding to the second input support electrode or pieces of differential data between the output signals and the baselines.

8. The input detection system according to claim 1, wherein the coupling portion is coupling wiring formed by a conductor.

9. The input detection system according to claim 1, wherein the coupling portion is an LC circuit.

10. An input detection system comprising:
    a detection device including a plurality of detection electrodes arrayed in a detection region; and an input support device including
- a first input support electrode,
- a second input support electrode provided so as to be movable on a concentric circle about a rotating axis overlapping with the first input support electrode, and
- a coupling portion that electrically couples the first input support electrode and the second input support electrode, wherein a position of the rotating axis of the input support device is fixed to the detection region of the detection device, in detection of the second input support electrode:
- a reference potential is supplied to one of the detection electrodes, the one corresponding to the first input support electrode; and
- a drive signal is supplied to another one of the detection electrodes, the another one of the detection electrodes corresponding to the second input support electrode, the input detection system has a calibration mode, in the calibration mode, baselines containing output signals from the detection electrodes corresponding to the second input support electrode at an initial position are acquired, in the detection of the second input support electrode after the calibration mode, the second input support electrode is detected based on the output signals output from the detection electrodes corresponding to the second input support electrode or pieces of differential data between the output signals and the baselines, and in the calibration mode, a position of a detection electrode that has an output signal having a greatest value relative to an average value of the output signals output from the detection electrodes corresponding to the second input support electrode is set to an initial position of the second input support electrode.

* * * * *